United States Patent
Bodla et al.

(10) Patent No.: US 12,448,009 B2
(45) Date of Patent: *Oct. 21, 2025

(54) PERCEPTION AND UNDERSTANDING OF VEHICLES

(71) Applicant: GM Cruise Holdings LLC, San Francisco, CA (US)

(72) Inventors: Navaneeth Bodla, Redwood City, CA (US); Sachithra Hemachandra, Sunnyvale, CA (US); Gia Tri Nguyen, Kirkland, WA (US); Shuai Zheng, Santa Clara, CA (US); Ajaya Hanasoge Shankaranarayana Rao, Sunnyvale, CA (US); Xiao Zhang, Los Altos, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 229 days.

This patent is subject to a terminal disclaimer.

(21) Appl. No.: 18/326,834

(22) Filed: May 31, 2023

(65) Prior Publication Data

US 2024/0400109 A1     Dec. 5, 2024

(51) Int. Cl.
*B60W 60/00*      (2020.01)
*G06V 10/764*     (2022.01)
*G06V 20/58*      (2022.01)

(52) U.S. Cl.
CPC ....... B60W 60/0027 (2020.02); *G06V 10/764* (2022.01); *G06V 20/58* (2022.01);
(Continued)

(58) Field of Classification Search
None
See application file for complete search history.

(56) References Cited

U.S. PATENT DOCUMENTS 10,852,743 B2     12/2020   Creusot et al.
2020/0202168 A1*   6/2020   Mao .................... G06V 10/809
(Continued)

FOREIGN PATENT DOCUMENTS

EP         4227909 A1 *   8/2023   ........ B60W 60/0015

OTHER PUBLICATIONS

Khoshkangini et al., *Predicting Vehicle Behavior Using Multi-task Ensemble Learning*, Expert Systems with Applications, https://doi.org/10.1016/j.eswa.2022.118716, Available online Sep. 15, 2022, 16 pages.

(Continued)

*Primary Examiner* — Christian Chace
*Assistant Examiner* — Shayne M. Gilbertson
(74) *Attorney, Agent, or Firm* — CANTOR COLBURN LLP

(57) ABSTRACT

Autonomous vehicles utilize perception and understanding of road users to predict behaviors of the road users, and to plan a trajectory for the vehicle. Understanding subtypes and attributes of vehicles may help autonomous vehicles better predict behaviors of and react to vehicles in a variety of road situations. To offer additional understanding capabilities, an additional understanding model is added to the perception and understanding pipeline to improve classification of vehicles and extraction of attributes of the vehicles. The exemplary architectures of the understanding model balance recall and precision performance metrics and computational complexity.

20 Claims, 9 Drawing Sheets

(52) U.S. Cl.
CPC .............. *B60W 2554/402* (2020.02); *B60W 2554/4046* (2020.02)

(56) References Cited

U.S. PATENT DOCUMENTS

| | | | |
|---|---|---|---|
| 2022/0051037 A1 | 2/2022 | Creusot et al. | |
| 2022/0413507 A1* | 12/2022 | Li | G01S 17/89 |
| 2024/0233314 A1* | 7/2024 | Suh | G06T 7/11 |
| 2025/0069358 A1* | 2/2025 | Khinvasara | G06V 10/255 |

OTHER PUBLICATIONS

Peng et al., *Object-Part Attention Model for Fine-grained Image Classification*, arXiv:1704.01740v2 [cs.CV], Sep. 25, 2017, 14 pages.

Vaswani et al., *Attention is All You Need*, 31st Conference on Neural Information Processing Systems (NIPS 2017), Long Beach, CA, USA, 15 pages.

Müller et al., *When Does Label Smoothing Help?*, 33rd Conference on Neural Information Processing Systems (NeurIPS 2019), Vancouver, Canada, 13 pages.

Ouyang et al., *A 3D-CNN and LSTM Based Multi-Task Learning Architecture for Action Recognition*, Special Section on AI-Driven Big Data Processing: Theory, Methodology, and Applications, IEEE Access, vol. 7, 2019, Date of Current Version Apr. 10, 2019, 14 pages.

Merrill et al., *End-to-End Multi-Task Machine Learning of Vehicle Dynamics for Steering Angle Prediction for Autonomous Driving*, www.researchgate.net/publication/337523229, Proceedings of ASME 2019 International Design Engineering Technical Conferences and Computer and Information in Engineering Conference, IDETC/CIE 2019, Aug. 18-21, 2019, Anaheim, CA, USA, 10 pages.

\* cited by examiner

PERCEPTION AND UNDERSTANDING OF VEHICLES

BACKGROUND

Technical Field

The present disclosure generally relates to autonomous vehicles (AVs) and, more specifically, to perception and understanding of vehicles by AVs.

Introduction

AVs, also known as self-driving cars, and driverless vehicles, may be vehicles that use multiple sensors to sense the environment and move without human input. Automation technology in AVs may enable vehicles to drive on roadways and to accurately and quickly perceive the vehicle's environment, including obstacles, signs, and traffic lights. Autonomous technology may utilize geographical information and semantic objects (such as parking spots, lane boundaries, intersections, crosswalks, stop signs, and traffic lights) for facilitating vehicles in making driving decisions. The vehicles can be used to pick-up passengers and drive the passengers to selected destinations. The vehicles can also be used to pick-up packages and/or other goods and deliver the packages and/or goods to selected destinations.

BRIEF DESCRIPTION OF THE DRAWINGS

The various advantages and features of the present technology will become apparent by reference to specific implementations illustrated in the appended drawings. A person of ordinary skill in the art will understand that these drawings show only some examples of the present technology and would not limit the scope of the present technology to these examples. Furthermore, the skilled artisan will appreciate the principles of the present technology as described and explained with additional specificity and detail through the use of the accompanying drawings.

DETAILED DESCRIPTION

Figure 1:
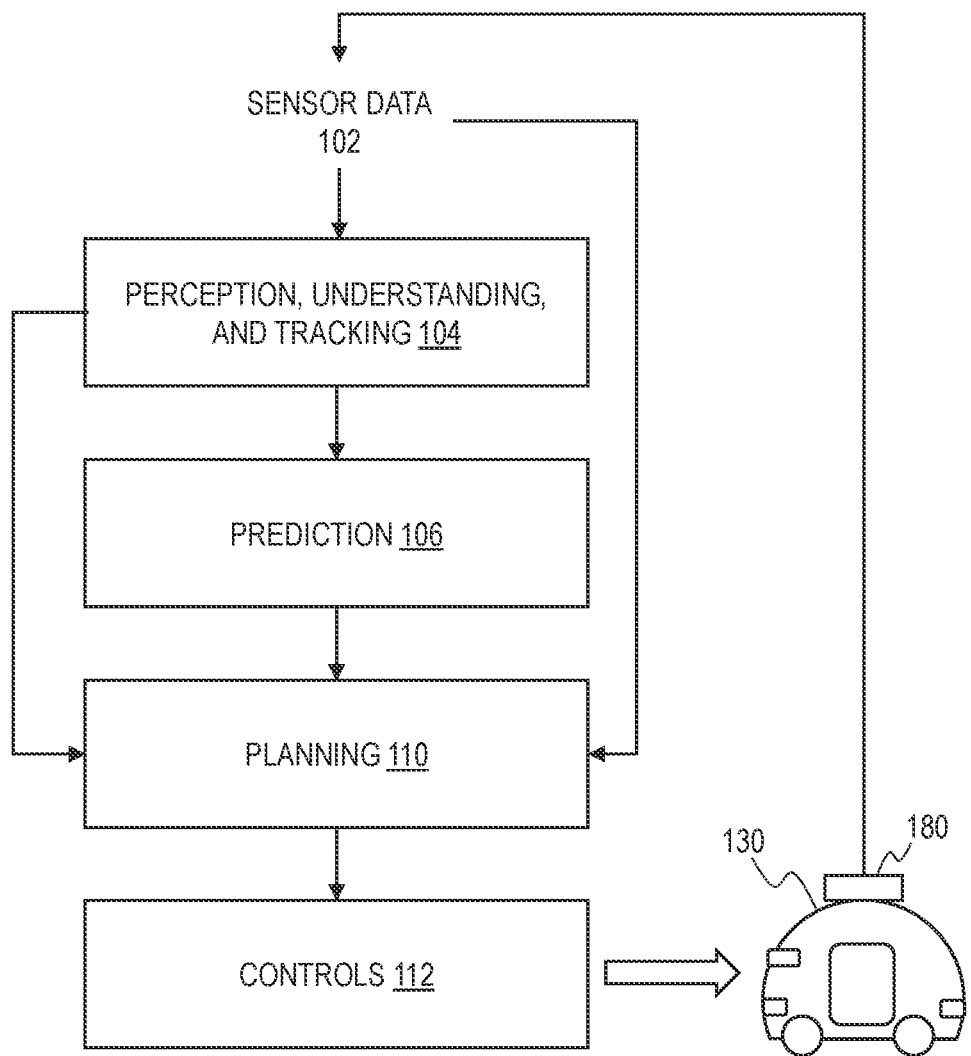
FIG. 1 illustrates an exemplary AV stack and an AV, according to some aspects of the disclosed technology.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details that provide a more thorough understanding of the subject technology. However, it will be clear and apparent that the subject technology is not limited to the specific details set forth herein and may be practiced without these details. In some instances, structures and components are shown in block diagram form to avoid obscuring the concepts of the subject technology.

Overview

AVs can provide many benefits. For instance, AVs may have the potential to transform urban living by offering an opportunity for efficient, accessible, and affordable transportation. AVs utilize perception and understanding of other vehicles to predict behaviors of the other vehicles, and to plan a trajectory for the AV. Understanding subtypes and attributes of vehicles may help AVs better predict behaviors of and react to other vehicles. Examples of subtypes of vehicles may include a car classification, a truck classification, a train classification, a light rail vehicle classification, an ambulance classification, etc. Examples of attributes of vehicles may include whether a vehicle is a delivery vehicle, whether a vehicle intends to turn left, whether the vehicle has a left-blinker light on, whether the vehicle's left door is open, etc. Ability to understand these subtypes and attributes may assist with further understanding of vehicles in the environment of the AV, prediction of behaviors/movements of the vehicles, and planning of a trajectory for the AV.

To offer additional understanding capabilities for vehicles, an additional understanding model is added to the perception and understanding pipeline to improve classification of vehicles (e.g., provide fine-grained classifications of vehicles) and extraction of attributes of the vehicles. The exemplary architectures of the understanding model balance recall and precision performance metrics and computational complexity. The vehicle understanding model may serve as a sub-model to a main understanding model. The understanding part of an AV may have multiple vehicle understanding models to process sensor data from different sensors, and the inferences from the vehicle understanding models may be fused by a vehicle understanding fusion part. Other understanding sub-models or downstream models may consume outputs of the vehicle road user understanding model, if desired.

The vehicle understanding model can output inferences such as vehicle subtype classification and extraction of vehicle attributes. The rich taxonomy of vehicle subtype classifications and vehicle attributes can benefit downstream consumers of the information, such as traffic understanding, interactions/relationships of road users understanding, prediction of objects' behavior and movements, and planning of the AV. The tasks to generate classifications and attributes of the taxonomy may be arranged or grouped into multiple task groups. A task group may include one or more tasks. The vehicle understanding model can be implemented as a multi-task learning model that has a shared backbone, one or more temporal networks dedicated to the task groups, and heads that are dedicated to task groups. Certain task groups may benefit from having global features and/or part features information. In some embodiments, the shared backbone may have a part detector that can generate global features and part features. A selected set of part features and global features may be provided to a part attention neural network dedicated to a specific task group. The output of the part attention neural network for several timestamps may then be processed by the temporal network dedicated to the specific task group.

The use of a shared backbone may prevent overfitting, when compared with the alternative of having separate models for each task or each task group. Because the vehicle understanding model focuses on tasks that are all addressing vehicles, the shared backbone may learn features which are common to these tasks or task groups, while leaving the temporal networks and heads dedicated to tasks or task groups to learn features which are unique to the specific tasks or task groups. Having heads dedicated to tasks or task groups may improve precision and recall performance metrics of the classifications and attributes specific to those tasks or task groups. One or more temporal networks can be included at the output of the shared backbone and in front of one or more heads to learn features that may be dynamic (e.g., varies over time), or have kinematic behaviors. The features may relate to intent of vehicles, vehicle signal lights, etc. Multiple tasks (e.g., tasks of a task group) can share the same temporal network. Some tasks, or some task groups may have dedicated temporal networks (some tasks or task groups may not have dedicated temporal networks). Providing dedicated temporal networks to tasks or task groups has the benefit of allowing the dedicated temporal networks to be configured differently depending on the task or task group. In some cases, temporal networks dedicated to different task groups may be receiving different subsets of part features extracted by the shared backbone, since some part features may be more relevant to certain task groups over other task groups.

The output inferences of the vehicle understanding model, in some cases, can be provided to a vehicle understanding fusion model. In some cases, the output inferences may be provided to one or more further sub-models for understanding an environment of the vehicle. For example, attributes relating to school buses produced by the vehicle understanding model can be provided to a traffic understanding sub-model, which may generate further understanding information to assist the planning of an AV. In another example, the output inferences, such as vehicle subtype classifications and intent-related attributes may be provided to a prediction part which may predict behaviors or movements of vehicles based on the output inferences.

Various embodiments herein and their advantages may apply to a wide range of vehicles (e.g., semi-autonomous vehicles, vehicles with driver-assist functionalities, etc.), and not just AVs.

Exemplary AV and an AV Stack that Controls the AV

FIG. 1 illustrates an exemplary AV stack and an AV 130, according to some aspects of the disclosed technology. An AV 130 may be equipped with a sensor suite 180 to sense the environment surrounding the AV and collect information (e.g., sensor data 102) to assist the AV in making driving decisions. The sensor suite 180 may include, e.g., sensor systems 804, 806, and 808 of FIG. 8. The AV stack may include perception, understanding, and tracking part 104, prediction part 106, planning part 110, and controls part 112.

The sensor data 102 may be processed and analyzed by perception, understanding, and tracking part 104 to track objects in the environment of the AV and determine a perception and understanding of the environment of the AV 130. Prediction part 106 may determine future motions and behaviors of the AV and/or tracked objects in the environment of the AV 130. The AV 130 may localize itself based on location information (e.g., from location sensors) and the map information. The planning part 110 may create planned paths or trajectories based on one or more of: information from perception, understanding, and tracking part 104, information from prediction part 106, the sensor data 102, map information, localization information, etc. Subsequently, planned paths or trajectories can be provided to controls part 112 to generate vehicle control commands to control the AV 130 (e.g., for steering, accelerating, decelerating, braking, turning on vehicle signal lights, etc.) according to the planned path.

The operations of components of the AV stack may be implemented using a combination of hardware and software components. For instance, an AV stack performing the perception, understanding, prediction, planning, and control functionalities may be implemented as software code or firmware code encoded in non-transitory computer-readable medium. The code for AV stack may be executed on one or more processor(s) (e.g., general processors, central processors (CPUs), graphical processors (GPUs), digital signal processors (DSPs), ASIC, etc.) and/or any other hardware processing components on the AV. Additionally, the AV stack may communicate with various hardware components (e.g., on-board sensors and control system of the AV) and/or with an AV infrastructure over a network. At least a part of the AV stack may be implemented on local computing device 810 of FIG. 8. At least a part of the AV stack may be implemented on the computing system 900 of FIG. 9 and/or encoded in instructions of storage device 930 of FIG. 9.

Exemplary Perception, Understanding, and Tracking Architecture

Figure 2:
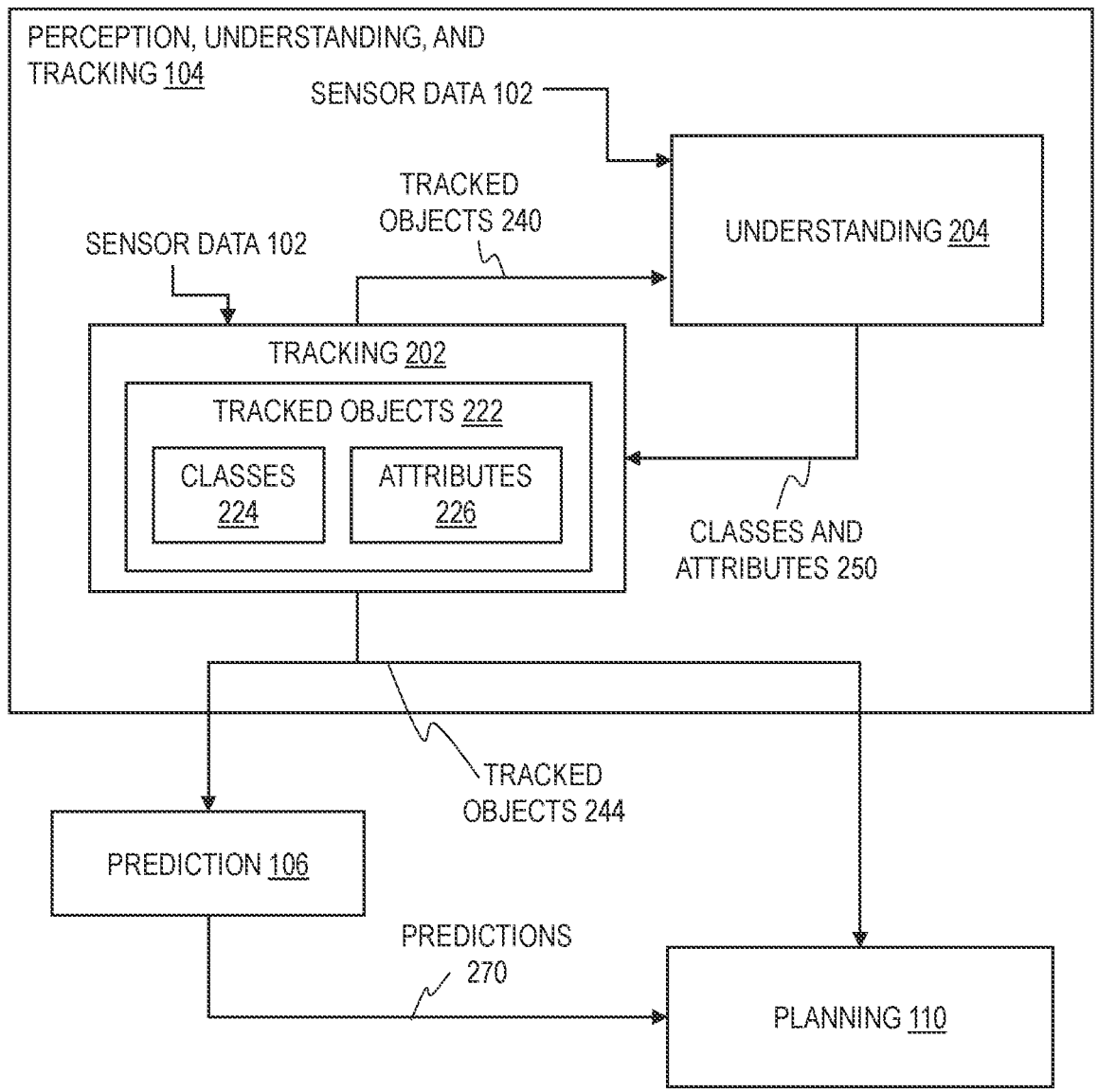
FIG. 2 illustrates an exemplary implementation of perception, understanding, and tracking part 104, prediction part 106, and planning part 110, according to some aspects of the disclosed technology.

FIG. 2 illustrates an exemplary implementation of perception, understanding, and tracking part 104, prediction part 106, and planning part 110, according to some aspects of the disclosed technology. The figure illustrates one exemplary configuration and arrangement of parts within an AV stack and is not intended to be limiting to the disclosure.

Perception, understanding, and tracking part 104 may include tracking part 202 and understanding part 204. Tracking part 202 may receive sensor data 102 from a sensor suite of an AV (the sensor suite may include, e.g., sensor systems 804, 806, and 808 of FIG. 8). Tracking part 202 may determine from the sensor data 102 presence of objects in an environment of the AV and track the objects presence over time (or across frames of data). The presence of an object can be encoded as a bounding box defining boundaries and location of an object in a three-dimensional space. The presence of an object can be encoded as location information and size information that specify the object's occupancy in space.

Understanding part 204 may receive sensor data 102 and optionally tracked objects information 240 (of tracked objects 222) to understand the objects in the environment of the AV. Understanding part 204 may process sensor data 102, e.g., using one or more machine learning models, to produce inferences about the tracked objects 222, such as one or more classes and/or one or more attributes for tracked objects 222. Understanding part 204 may provide classes and attributes 250 as feedback information to tracking part 202. Directly or indirectly, classes and attributes 250 produced by understanding part 204 may be provided to prediction part 106 and/or planning part 110 to assist prediction and/or planning functionalities respectively.

As illustrated in the figure, tracking part 202 may serve as a classes and attributes collector and can collect and maintain classes 224 and/or attributes 226 for tracked objects 222. The objects and information associated with the objects may be maintained as tracked objects 222 in tracking part 202. Tracked objects 222 may be in a format of a database or collection of data that includes data entries for tracked objects 222, where each data entry for a tracked object may include information for the tracked object, such as an object identifier of the tracked object, bounding box of the tracked object, one or more classifications of the tracked object, and one or more attributes of the tracked object. Tracked objects 222 may be in a different format, e.g., such as a grid map or raster map of an environment surrounding the AV, whose pixels may store information for various tracked objects, such as an object identifier of the tracked object, bounding box of the tracked object, one or more classifications of the tracked object, and one or more attributes of the tracked object.

Perception, understanding, and tracking part 104 may provide tracked objects information 244 (of tracked objects 222) to prediction part 106. Perception, understanding, and tracking part 104 may provide tracked objects information 244 (of tracked objects 222) to planning part 110. Prediction part 106 may provide predictions 270 to planning part 110. Tracked objects information 240 and/or tracked objects information 244 may include at least some of the information maintained in tracked objects 222. Tracked objects information 244 provided from tracking part 202 to prediction part 106 and planning part 110 may include information produced by tracking part 202 and information produced by understanding part 204.

Exemplary Understanding Part Having Multiple Models

Figure 3:
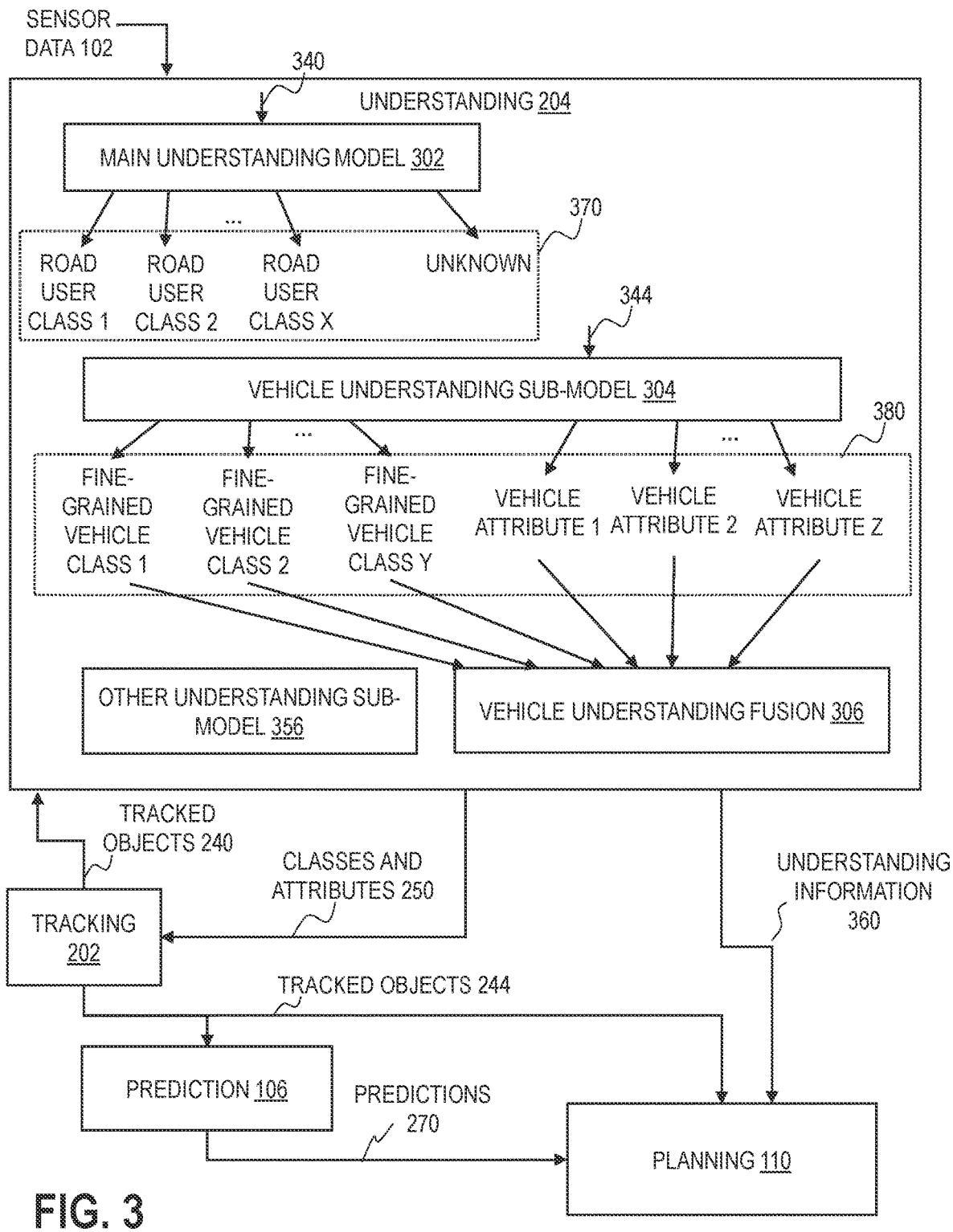
FIG. 3 illustrates an exemplary implementation of understanding part 204, tracking part 104, prediction part 106, and planning part 110, according to some aspects of the disclosed technology.

FIG. 3 illustrates an exemplary implementation of understanding part 204, tracking part 104, prediction part 106, and planning part 110, according to some aspects of the disclosed technology. The parts may form at least a part of an AV stack for an AV (not shown). The AV may have sensors, one or more processors, and one or more storage media encoding instructions executable by the one or more processors to implement one or more parts of the AV stack, such as the parts illustrated in the figure. The sensors may include, e.g., sensor systems 804, 806, and 808 of FIG. 8. The one or more processors and the one or more storage media may be an exemplary implementation of local computing device 810 of FIG. 8. The one or more processors and the one or more storage media may be an exemplary implementation of the computing system 900 of FIG. 9. One or more models may be machine learning models.

Understanding part 204 may include a main understanding model 302 and a vehicle understanding sub-model 304. The main understanding model 302 may classify a tracked object into at least one of: one or more road user classifications, and an unknown road user/object classification. The one or more road user classifications may include, e.g., a bicycle classification, a motorcycle classification, a vehicle classification, a vulnerable road user classification, etc. In some cases, the main understanding model 302 may receive sensor data 340 that corresponds to a tracked object, such as a tracked object that has not yet been classified by an understanding model (e.g., tracking part 202 may have detected the presence of the tracked object, and understanding part 204 has not yet produced an inference). Main understanding model 302 may have one or more outputs 370 that produce one or more inferences on the tracked object, e.g., whether the tracked object represented in the input sensor data 340 belongs to one or more classes or classifications. As illustrated, main understanding model 302 may output an inference that assigns the tracked object to one of several classes, e.g., road user class 1, road user class 2, . . . road user class X, and unknown class. Preferably, the main understanding model 302 can identify road users in the environment of the AV. Examples of road user classes may include: vehicle class, bicycle class, motorcycle class, vulnerable road user class, etc. Examples of unknown user/object classifications may include unknown user/object, dynamic unknown user/object (e.g., moving unknown user/object), and static unknown user/object (e.g., stationary unknown user/object). Inferences from one or more outputs 370 may be provided to tracking part 202.

The vehicle understanding sub-model 304 may classify a tracked object with vehicle classification assigned or inferred by the main understanding model 302, into one or more vehicle subtype classes. Examples of vehicle subtype classes can include, e.g., car, truck, light rail vehicle, emergency medical vehicle, school bus, train, etc. The vehicle understanding sub-model 304 may extract one or more vehicle attributes about the tracked object. Vehicle understanding sub-model 304 may receive sensor data 344 (generated from the sensors of the AV) corresponding to tracked objects having the vehicle classification, such as a tracked object that has been classified by main understanding model 302 as having the vehicle classification. Vehicle understanding sub-model 304 may have one or more outputs 380 that produce one or more inferences on the tracked object having the vehicle classification. Exemplary inferences may include whether the tracked object represented in the input sensor data 344 belongs to one or more vehicle subtype classes or classifications. Exemplary inferences may include whether the tracked object represented in the input sensor data 344 has certain vehicle attributes or properties. As illustrated, the vehicle understanding sub-model 304 may output an inference that assigns the tracked object having a vehicle classification to one of several vehicle subtype classes, e.g., fine-grained vehicle class 1, fine-grained vehicle class 2 . . . and fine-grained vehicle class Y. The vehicle understanding sub-model 304 may output inferences about one or more attributes (or properties) of the tracked object, e.g., vehicle attribute 1, vehicle attribute 2 . . . and vehicle attribute Z. Outputs 380, e.g., encoding inferences of vehicle understanding sub-model 304, may indicate discrete classes (e.g., a class) and/or continuous values (e.g., a probability or likelihood).

Vehicle understanding sub-model 304 may be a multi-task learning model to generate inferences on vehicles and produce meaningful and rich inferences that can support other parts of the AV stack. Tasks being performed by the multi-task learning model may output respective inferences. Tasks producing inferences may be arranged or assigned into task groups. In other words, a task group may include one or more tasks, or may generate one or more inferences corresponding to the tasks. Parts (e.g., layers, or networks) of the multi-task learning model may be dedicated to processing data, extracting features, and/or generating inferences of respective task groups. Tasks in a task group may share a part of the multi-task learning model dedicated to the task group.

The vehicle understanding sub-model 304 may include a shared backbone, one or more temporal networks, and a plurality of heads. The shared backbone may receive and process sensor data generated from the sensors corresponding to tracked objects having the vehicle classification. The temporal networks may be dedicated to respective task groups. A temporal network dedicated to a task group may process an output of the shared backbone and provide an output to head(s) that are outputting inferences for the task group. The plurality of heads may output inferences for respective task groups. The inferences may include one or more vehicle subtype classifications and one or more vehicle attributes. Exemplary architectures for the vehicle understanding sub-model 304 are illustrated and described with FIGS. 4-6. Variations of the architecture may balance performance and computational complexity of the model.

For a vehicle that is in the environment of an AV, one feature of the vehicle may be captured by sensor data of one camera in the sensor suite of the AV, and another feature of the vehicle may be captured by sensor data of another camera in the sensor suite of the AV. In some cases, the same feature of the vehicle may be captured by sensor data of two different cameras in the sensor suite of the AV (due to overlapping field of views of the cameras). In some cases, a feature of a vehicle may be occluded in sensor data of one camera in the sensor suite, but is not occluded in sensor data of another camera in the sensor suite. Vehicle understanding sub-model 304 may perform feature extraction based on the received sensor data 344, where the sensor data 344 is generated by a first sensor of the AV. The understanding part 204 may have additional instance(s) of vehicle understanding sub-model 304 to perform feature extraction based on sensor data generated by one or more other sensors of the AV. In some cases, the understanding part 204 may have other understanding sub-model(s) that are performing feature extraction of vehicles (possibly using different models or methodologies) based on sensor data produced by the sensor suite of the AV. Those other understanding sub-model(s) may also be generating their own inferences about vehicles in the environment of the AV. The inferences from the heads of the different instances of the vehicle understanding sub-model 304 may be provided to a vehicle understanding fusion part 306. If other understanding sub-model(s) are producing inferences about vehicles, those inferences may be provided to vehicle understanding fusion part 306.

Vehicle understanding fusion part 306 may implement geometric fusion reasoning to combine or relate inferences from different models corresponding to the same vehicle in the environment. Geometric fusion reasoning may include determining whether the inferences correspond to locations on the same bounding box of a vehicle. The bounding box information (including, e.g., coordinates information, height information, width information, and height information based on a reference coordinate system) corresponding to the vehicle may be determined and provided, by tracking part 202, to the vehicle understanding fusion part 306. Vehicle understanding fusion part 306 may map locations of the inferences onto the reference coordinate system of the bounding box information to determine whether the inferences belong to the same vehicle.

Vehicle understanding fusion part 306 may implement semantic reasoning to relate or fuse inferences from different models corresponding to a same vehicle in the environment. Semantic fusion reasoning may include determining whether the inferences corresponding to a same vehicle together indicate a different semantic meaning than the inferences alone. For example, semantic fusion reasoning may combine a left-blinker light on attribute of a vehicle from one model and a right-blinker light on attribute of the same vehicle inferred by a different model and infer a hazard lights on attribute for the vehicle. Semantic fusion reasoning may combine a flashing top light active attribute of a vehicle inferred by one model, and a commercial security vehicle subtype classification of the same vehicle inferred by a different model and infer that the vehicle is an active commercial security vehicle (as opposed to inferring that the vehicle is an active law enforcement vehicle).

Vehicle understanding fusion part 306 may output fused inferences (e.g., final vehicle understanding inferences) about the vehicles in the environment of the AV. The fused inferences may be consumed by one or more downstream models.

Inferences of Vehicles and Task Grouping Considerations

The vehicle understanding sub-model 304 may be implemented to produce many inferences about tracked objects with the vehicle classification. Inferences can include classifications (e.g., whether a tracked object belongs to or matches a certain subtype class or classification out of a set of classifications), and attributes (e.g., whether a tracked object has a certain attribute or property). A tracked object can belong to a class or classification, and may have one or more attributes. The vehicle understanding sub-model 304 may produce a continuous value (or probability) that a tracked object belongs to or matches a certain subtype class or classification. The vehicle understanding sub-model 304 may produce a vehicle subtype inference that that selects a vehicle subtype classification between two or more vehicle subtype classifications (e.g., outputs a classification to which a given tracked object most likely belong or has the best match). The vehicle understanding sub-model 304 may produce a continuous value (or probability) that a tracked object exhibits a certain attribute or property. The vehicle understanding sub-model 304 may produce a binary value indicating whether a tracked object exhibits a certain attribute or property. A task refers to the production of an inference by a multi-task learning model. In some cases, attributes may represent sub-classes or sub-classifications of vehicle understanding subtype class.

As a multi-task learning model, the vehicle understanding sub-model 304 may perform many tasks. The vehicle understanding sub-model 304 may have heads (sometimes referred to as task heads) as the output networks that are generating the inferences.

Exemplary inferences related to vehicle understanding subtype classifications can include:
Train classification,
Light rail vehicle classification,
Commuter bus classification,
School bus classification,
Truck classification,
Heavy vehicle classification,
Emergency vehicle classification,
Ambulance vehicle classification,
Law enforcement (or police) vehicle classification,
Military vehicle classification,
Fire truck vehicle classification,
Commercial security vehicle classification,
Farm vehicle classification,
Construction vehicle classification,
Recreational vehicle classification,
Tow truck vehicle classification,
Parking enforcement vehicle classification,
Utility vehicle classification,
Other or unknown vehicle classification, and
Car classification (personal vehicle).

Exemplary inferences related to vehicle understanding attributes can include:

Emergency vehicle subtype classification or attribute: whether an emergency vehicle is an ambulance,
Emergency vehicle subtype classification or attribute: whether an emergency vehicle is a law enforcement vehicle,
Emergency vehicle subtype classification or attribute: whether an emergency vehicle is a military vehicle,
Emergency vehicle subtype classification or attribute: whether an emergency vehicle is a fire truck,
Emergency vehicle attribute: whether an emergency vehicle is active,
Emergency vehicle attribute: whether an emergency vehicle is not active,
Emergency vehicle subtype classification or attribute: whether an emergency vehicle is intentionally blocking traffic,
Emergency vehicle subtype classification or attribute: whether an emergency vehicle is intentionally blocking traffic,
Emergency vehicle subtype classification or attribute: whether an emergency vehicle has flashing lights on,
Vehicle signal attribute: whether a vehicle has a left-blinker light on,
Vehicle signal attribute: whether a vehicle has a right-blinker light on,
Vehicle signal attribute: whether a vehicle has a hazards light on,
Vehicle signal attribute: whether a vehicle has a brake light on,
Vehicle signal attribute: whether a vehicle has reverse lights on,
Vehicle signal attribute: whether the brake light on a vehicle is flashing (driver is tapping on the brakes),
Vehicle signal attribute: whether the brake light on a vehicle is flashing (driver is tapping on the brakes),
Vehicle signal attribute: whether a vehicle intends to perform a driving maneuver that would require turning on left-blinker light but does not actually turn on the left-blinker light,
Vehicle signal attribute: whether a vehicle intends perform a driving maneuver that would require turning on right-blinker light but does not actually turn on the right-blinker light,
Vehicle signal attribute: whether a vehicle has driving lights on,
Vehicle signal attribute: whether a vehicle has driving lights off,
Vehicle signal attribute: whether a vehicle has high beams on,
Vehicle signal attribute: whether a vehicle is flashing high beams,
Vehicle signal attribute: whether a vehicle is a miscellaneous flashing light bar on,
School bus flashing light attribute: whether a school bus has red lights on,
School bus flashing light attribute: whether a school bus has yellow lights on,
School bus flashing light attribute: whether a school bus have neither red nor yellow lights on,
School bus activeness attribute: whether a school bus is active (picking up students or dropping off students),
School bus activeness attribute: whether a school bus has an open STOP SIGN,
School bus activeness attribute: whether a school bus has a closed STOP SIGN,
School bus activeness attribute: whether a school bus is active (picking up students or dropping off students),
Vehicle attribute: whether a vehicle is a delivery vehicle,
Vehicle attribute: whether a vehicle is not a delivery vehicle,
Vehicle attribute: whether a vehicle has an object (e.g., in a truck bed, on top of vehicle, etc.),
Vehicle attribute: whether a vehicle is a trailer,
Vehicle attribute: whether a vehicle is controlling another vehicle,
Vehicle attribute: whether a vehicle is being controlled by another vehicle,
Vehicle attribute: whether a vehicle is carrying an extra heavy load,
Vehicle attribute: whether a vehicle is carrying an extra long load,
Vehicle attribute: whether a vehicle is towing another vehicle or wheeled body,
Vehicle attribute: whether a vehicle is carrying an oddly shaped load,
Vehicle open door attribute: whether a left door of a vehicle is open,
Vehicle open door attribute: whether a right door of a vehicle is open,
Vehicle open door attribute: whether a trunk door of a vehicle is open,
Vehicle open door attribute: whether a hood of a vehicle is open, and
Vehicle open door attribute: whether a roof of a vehicle is open.

It may be desirable for understanding part 204 of FIG. 2 to generate many inferences about vehicles. Generating many inferences can be a challenge, because having a separate machine learning model for each task would be computationally too expensive and may result in overfitting of the model to individual tasks. In some cases, a multi-task learning model may be implemented so that the tasks can share a backbone but may include networks that are dedicated to individual tasks. Computational complexity may grow linearly with the number of tasks. By carefully grouping tasks into task groups, tasks in a specific task group may share the dedicated parts of a multi-task learning model for the task group, avoid overfitting, and reduce computational complexity.

The vehicle understanding sub-model 304 may generate inferences for two or more task groups. In some embodiments, the vehicle understanding sub-model 304 may generate inferences for four task groups. If the tasks are not grouped into task groups, the multi-task learning model may provide many dedicated parts to the tasks individually, which can significantly increase computational complexity without significant improvement in performance of the individual tasks.

Arranging and defining the task groups are not trivial. Since each task group may have a dedicated temporal network, heads, and in some cases a dedicated part attention neural network, computational complexity can be high if there are too many task groups. Not implementing enough task groups may mean that performance of the task group may suffer, since the learning for all the tasks in a task group may become over generalized. Offering dedicated networks for task groups allows for configurability (e.g., tuning for specific task groups), which may offer some efficiencies if the dedicated networks can be configured to reduce excessive or unnecessary processing for the required performance. Providing dedicated networks also may offer machine learning of features that would be specific to the task group, which may improve precision and recall performance of the task groups.

Preferably, tasks that may be similar in nature may be grouped into a task group. Tasks that are extracting classifications and/or attributes that are more static in nature may be grouped into a task group. Fine-grained vehicle subtype classification may be more static in nature. Tasks that are extracting attributes that are related to the same kind of vehicle may be grouped into a task group. Tasks that are classifying vehicles as school buses and extracting school bus related attributes may relate be grouped into a task group. Tasks that are classifying vehicles as different emergency vehicle subtype classifications and extracting emergency vehicle attributes may relate be grouped into a task group. Tasks that are extracting attributes that may rely on a longer sequence of images (e.g., vehicle signal attributes) may be grouped into a task group. A given task may be added to a task group to ensure that the given task does not get overpowered by the loss function of another task in the same task group.

In some embodiments, the vehicle understanding sub-model 304 has three or more task groups. Task grouping may take into account some of the considerations mentioned above. Exemplary task groups can include:
- a first task group to extract an emergency vehicle classification, extract emergency vehicle subtype classifications, and extract one or more emergency vehicle flashing light attributes,
- a second task group to extract vehicle signal attributes,
- a third task group to extract school bus classification, extract one or more school bus flashing light attributes, and extract one or more school bus activeness attributes,
- a fourth task group to extract vehicle subtype classifications and extract one or more vehicle attributes,
- a fifth task group to extract vehicle subtype classifications, and
- a sixth task group to extract one or more vehicle open door attributes.

Figure 4:
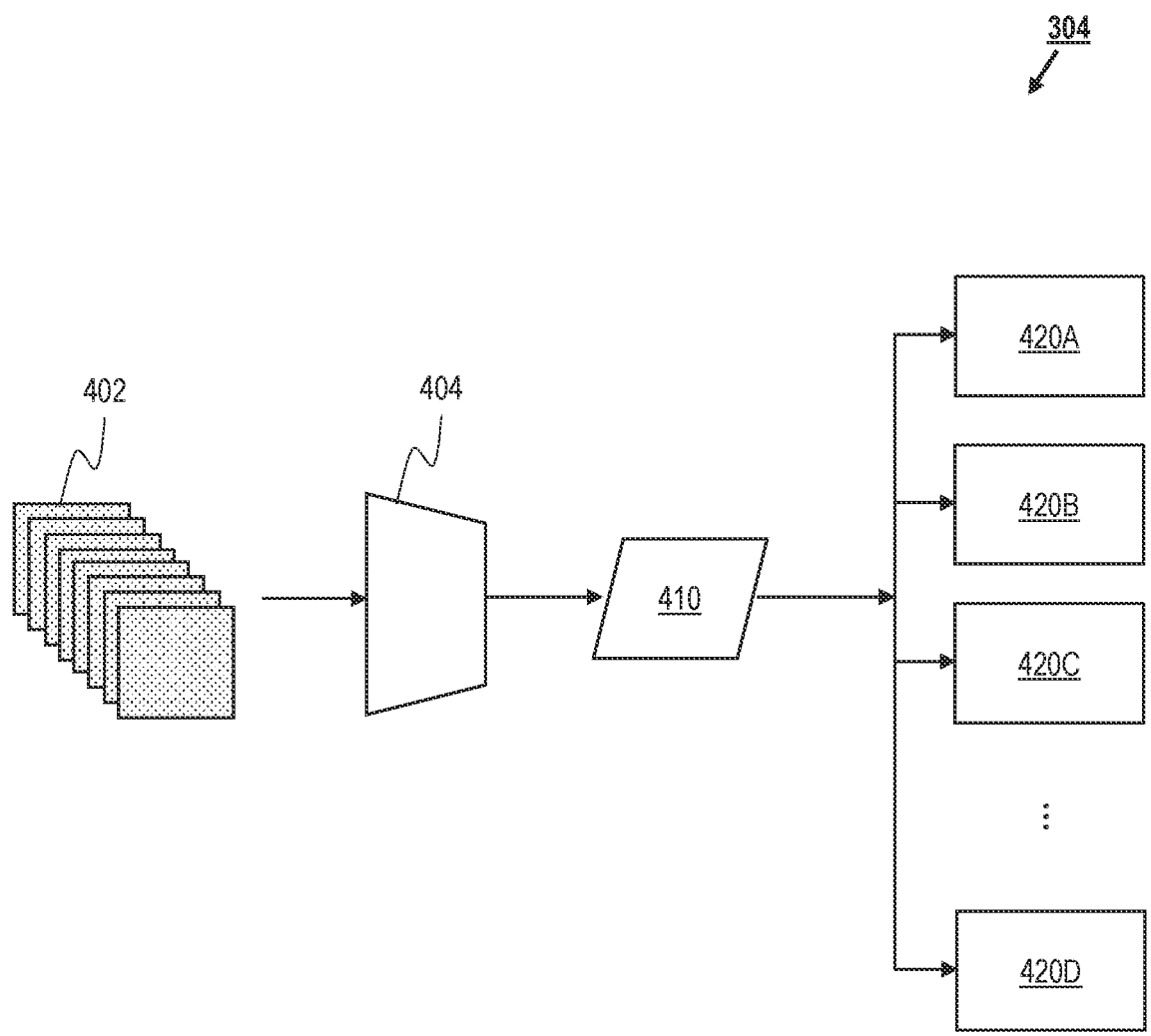
FIG. 4 illustrates an exemplary architecture for the vehicle understanding sub-model 304, according to some aspects of the disclosed technology.
Figure 5:
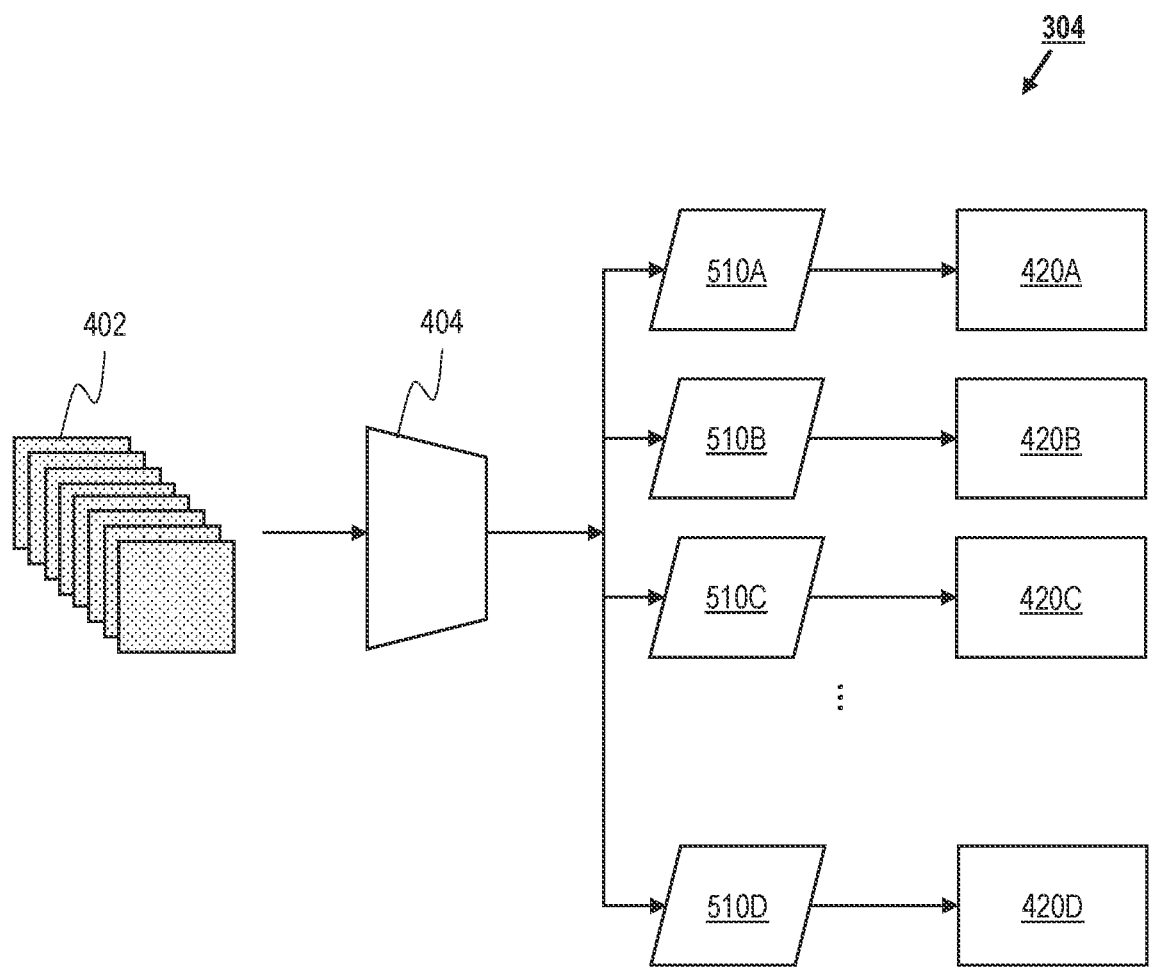
FIG. 5 illustrates another exemplary architecture for the vehicle understanding sub-model 304, according to some aspects of the disclosed technology.
Figure 6:
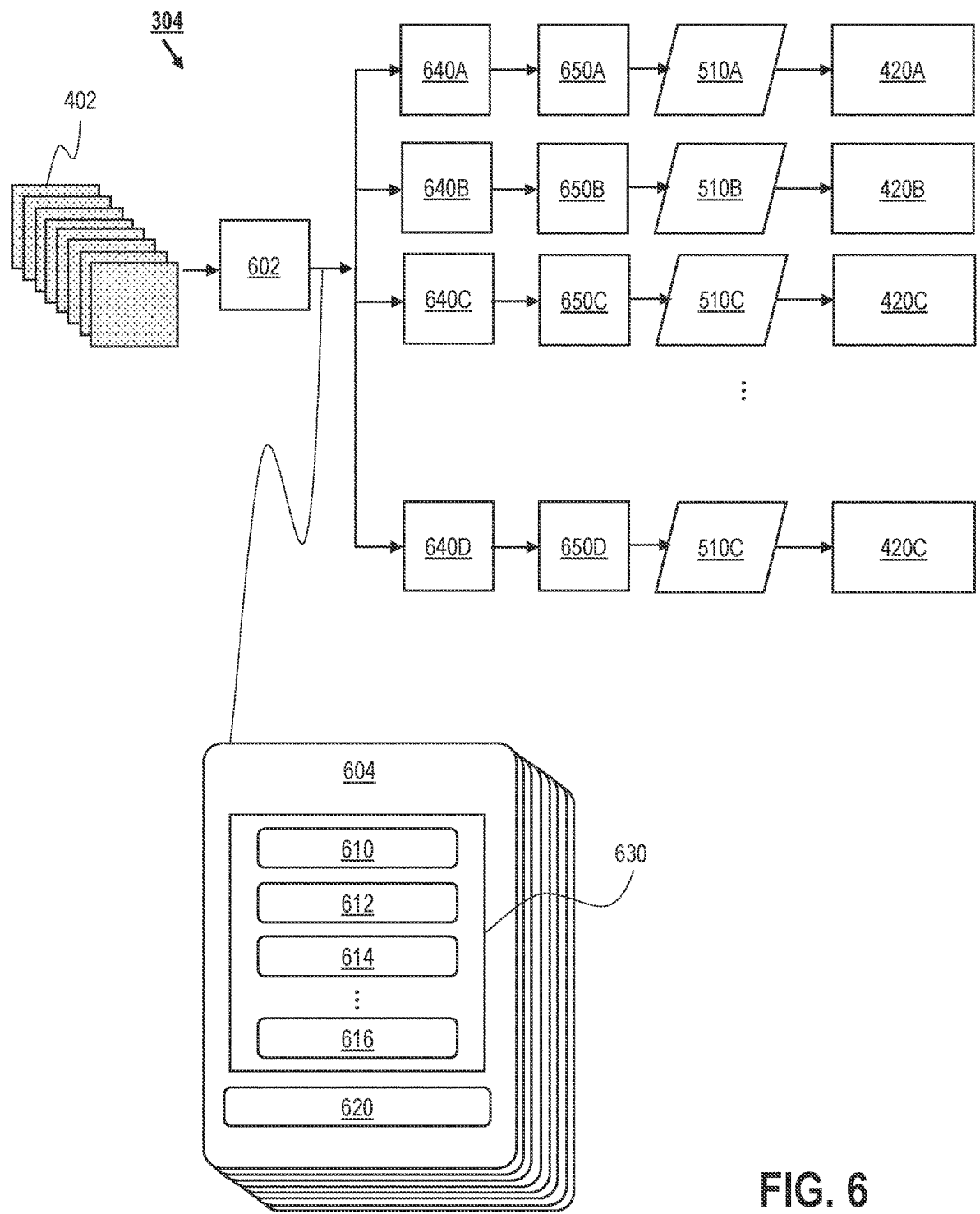
FIG. 6 illustrates yet another exemplary architecture for the vehicle understanding sub-model 304, according to some aspects of the disclosed technology.

Exemplary architectures for vehicle understanding sub-model 304 to produce inferences for three (or more) task groups are illustrated and described with FIGS. 4-6. Variations of the architecture may balance performance and computational complexity of the model.

Exemplary Downstream Consumers of Vehicle Understanding Sub-Model

Inference(s) produced by vehicle understanding sub-model 304 can advantageously be used by one or more downstream understanding models to better understand the environment surrounding an AV. Referring back to FIG. 3, understanding part 204 may include other understanding sub-model 356. The other understanding sub-model 356 may process sensor data and/or other information to understand interactions of, connections between, or relationships between, various vehicles on the road. For example, the other understanding sub-model 356 may infer whether one vehicle controls another vehicle, or one vehicle is controlled by another vehicle. The other understanding sub-model 356 may produce understanding information 360 to downstream parts such as, tracking part 202, prediction part 106, and planning part 110.

The other understanding sub-model 356 may be an inter-actions/relationship understanding sub-model, which may process sensor data and/or other information to understand relationships and interactions between different road users. For example, interactions and relationships understanding may help understand whether a vehicle will yield to the AV making a lane change, understand whether a double-parked vehicle is unlikely to move, or understand if vehicles are traveling as a group (e.g., a vehicle is being towed). The other understanding sub-model 356 may receive one or more inferences from the vehicle understanding sub-model 304. The interactions/relationships understanding sub-model may produce understanding information 360 to the prediction part 106 or planning part 110.

The other understanding sub-model 356 may be a traffic understanding sub-model, which may process sensor data and/or other information to understand situations on the road such as (temporary) traffic restrictions, construction zones, school bus pick-up situation, school bus drop-off situation, accident situation, emergency traffic situation, natural disaster situation, public safety situation, etc. The other understanding sub-model 356 may receive one or more inferences from the vehicle understanding sub-model 304. The traffic understanding sub-model may produce one or more traffic directives (as understanding information 360) to the planning part 110.

In some embodiments, tracking part 202 may produce bounding boxes of tracked objects in an environment of the vehicle. The bounding boxes of tracked objects can be provided to the understanding part 204. The sensor data 344 at the input of vehicle understanding sub-model 304 from the sensors corresponding to the tracked objects having the unknown object classification may be cropped. For example, the sensor data 344 may include camera images cropped based on projections of bounding boxes of the tracked objects having the vehicle classification onto camera images captured by the sensors. Processing cropped images (as opposed to full images) can reduce computational complexity.

In some embodiments, the inferences of the understanding part 204 (e.g., inferences from main understanding model 302, inferences from vehicle understanding sub-model, and inferences from other understanding sub-model 356) can be provided to the tracking part 202. Inferences may be provided as classes and attributes 250 to tracking part 202. Tracking part 202 may be a collector for classes and attributes of various tracked objects.

Prediction part 106 may receive at least one of the inferences generated by the plurality of heads and to predict behaviors of tracked objects in an environment of the vehicle. Expected behaviors and movements of road objects can be different depending on the subtype of vehicle and/or attributes of vehicle. Some inferences may impact how prediction part 106 predicts future pose and future kinematics of various types of tracked objects. For example, a vehicle that has a certain subtype classification may be predicted to decelerate slower than another vehicle that has a different subtype classification. In another example, a vehicle that is a delivery vehicle may be predicted to move slowly and may make frequent stops.

Planning part 110 may receive at least one of the inferences generated by the plurality of heads (or other models in understanding 204) and to generate a trajectory for the vehicle. Some inferences may impact how planning part 110 generates planned paths for the AV. For example, the planning part 110 may plan a path for an AV according to a school bus activeness attribute.

Various machine learning models may consume inferences produced by the vehicle understanding sub-model 304. An exemplary downstream model may be a part of understanding part 204. An exemplary downstream model may be a part of prediction part 106. An exemplary downstream model may be a part of planning part 110. The inferences, e.g., vehicle subtype classifications, may include a probability that a tracked object belongs to or matches a certain vehicle subtype classification, and a confidence estimate associated with the probability or classification result. The confidence estimate may indicate how likely the vehicle understanding sub-model 304 is correct or incorrect. Downstream model may make certain decisions to use or not use certain classification results, or rely on certain classification results more or less, depending on the confidence estimate. The vehicle understanding sub-model 304 may be updated through additional training of the vehicle understanding sub-model 304, and/or updates to the architecture or configuration of the vehicle understanding sub-model 304. Through these updates, the probability distributions of the confidence estimates may change. A downstream model may expect the confidence estimate probability distributions to remain the same after an updated model is deployed onto the vehicle. In some cases, the vehicle understanding sub-model 304 may be over confident, and may not reflect ground truth correctness likelihood. For these reasons, a calibration part may be included (e.g., as part of understanding part 204) to correct confidence estimates of inferences output by the heads of the vehicle understanding sub-model 304. Confidence estimates of the output inferences produced by the vehicle understanding model may be post-processed by calibration to calibrate for deviations between model updates and/or over confidence issues. Post-processing may include temperature scaling to calibrate the confidence estimates. The amount of scaling being applied by temperature scaling may be determined through a golden-search optimization technique. A calibration part may output calibrated confidence estimates to one or more downstream models.

Exemplary Multi-Task Learning Architectures for Vehicle Understanding Model

The vehicle understanding model, such as the vehicle understanding sub-model 304 of FIG. 3, can be implemented as a multi-task learning model. FIG. 4 illustrates an exemplary architecture for the vehicle understanding sub-model 304, according to some aspects of the disclosed technology. FIG. 5 illustrates another exemplary architecture for the vehicle understanding sub-model 304, according to some aspects of the disclosed technology. FIG. 6 illustrates yet another exemplary architecture for the vehicle understanding sub-model 304, according to some aspects of the disclosed technology. In FIGS. 4-6, the architecture of the multi-task learning model may include shared layers (e.g., a shared backbone), one or more temporal networks, and task group specific layers (e.g., heads, part attention neural networks, etc.).

In FIGS. 4-6, the task group specific layers or heads are shown as first heads 420A, second heads 420B, third heads 420C, and fourth heads 420D. There may be two or more task group specific heads in the multi-task learning model. The task group specific heads may output inferences for respective task groups. The inferences may include one or more vehicle subtype classifications and one or more vehicle attributes. A given task group specific layers or heads have an output layer that can generate these inferences (e.g., as numerical values). The task group specific layers or heads may include deep neural networks. The task group specific layers may include fully connected neural network layers with heads or output nodes to output inferences for the respective task groups. First heads 420A may be dedicated to a first task group. Second heads 420B may be dedicated to a second task group. Third heads 420C may be dedicated to a third task group. Fourth heads 420D may be dedicated to a fourth task group. The four task groups are distinct. First heads 420A may have fully connected neural network layers with heads or output nodes to output inferences for a first task group. Second heads 420B may have fully connected neural network layers with heads or output nodes to output inferences for a second task group. Third heads 420C may have fully connected neural network layers with heads or output nodes to output inferences for a third task group. Fourth heads 420D may have fully connected neural network layers with heads or output nodes to output inferences for a fourth task group.

The shared layers or shared backbone can be shared across all tasks and task groups. In FIGS. 4-5, the shared layers or shared backbone includes a neural network 404. In FIGS. 5-6, the shared backbone can receive and process sensor data 402 generated from the sensors corresponding to tracked objects having the vehicle classification. In some cases, the shared backbone may receive and process sensor data 402 generated from the sensors corresponding to tracked objects (and not restricted to ones which have the vehicle classification).

The shared layers or the shared backbone, e.g., neural network 404, may include a deep neural network, such as multi-layer perceptrons, convolutional neural networks, and residual neural networks. The shared backbone may include a residual neural network, which can be advantageous for training and processing sensor data having camera image frames. The shared backbone may include a neural network to extract spatial features of input sensor data 402. Sensor data 402 may include camera image frames or sequences of camera images. Sensor data may include other types of sensor data generated by sensor systems 804, 806, and 808 of FIG. 8.

The neural network 404 may generate a spatial map (e.g., global feature map) for each camera image received as sensor data 402. The neural network 404 may generate multiple spatial maps for a sequence of camera images received as sensor data 402. The spatial maps may be vectorized as vectorized spatial maps. Vectorized spatial maps may correspond to a sequence of (camera) image frames provided as the sensor data 402 to the shared backbone, e.g., neural network 404.

Because some vehicle subtype classifications and/or vehicle attributes may have dynamic features, may have certain characteristic kinematics, or may rely on features that may be observable over a period of time, one or more temporal layers (e.g., temporal networks) may be included between the shared backbone and the heads.

In FIG. 4, a temporal network 410 is included in the architecture, to process outputs from neural network 404 (e.g., vectorized spatial maps corresponding to a sequence of image frames at different timestamps). Temporal network 410 may generate outputs which may be processed by the heads downstream. Temporal network 410 is shared across all tasks and task groups in the illustration.

In FIGS. 5-6, one or more temporal networks are included in the architecture. A temporal network may be dedicated to extract temporal features for a specific task group. Tasks of the same task group may share the same temporal network. Specifically, the multi-task learning model architecture may include one or more task group specific temporal layers, e.g., first temporal network 510A, second temporal network 510B, third temporal network 510C, and fourth temporal network 510D. A task group specific temporal layer may be dedicated and configured to extract temporal features for a task group. Temporal layers may help the vehicle understanding model to extract features that are dynamic or learn kinematic features (across multiple frames of input data) to improve performance of the task group. A task group to extract vehicle signals attributes may benefit from having a task group specific temporal layer. A task group to extract emergency vehicle activeness attributes may benefit from having a task group specific temporal layer. A task group to extract school bus activeness attributes may benefit from having a task group specific temporal layer.

A temporal network may include a recurrent neural network. A temporal network can include a long short-term memory network. A temporal network may include a multi-head attention model or multi-head attention neural network. One benefit of using multi-head attention neural networks is the ability to train the temporal network faster since multi-head attention neural networks can train input data in parallel.

Depending on the task group, a temporal network may or may not be needed or implemented. Depending on the task group, the temporal network upstream of the task group specific heads may be configured differently (e.g., omitting an input gate, omitting a forget gate, omitting an output gate, omitting an input activation function, omitting an output activation function, coupled input and forget gate, no peepholes, full gate recurrence, varying sequence length, etc.). The temporal networks may be configured differently to learn to extract features that occur over a longer or shorter period of time, or over a longer or shorter sequence of frames.

Ensuring tasks are grouped may help to reduce computational complexity because temporal networks can be computationally expensive. By grouping tasks into task groups, the architecture can dedicate temporal networks to task groups as opposed to each task. Implementing multiple temporal networks dedicated to different task groups also allow the individual temporal networks to be tuned for the task group to improve performance of the task group while ensuring that computational resources are not spent on task groups that do not require them for the same performance.

In FIG. 5, a first temporal network 510A may be provided downstream of the neural network 404 and in front of the first heads 420A, to extract temporal features for the first task group. The first temporal network 510A may receive and process vectorized spatial maps from neural network 404. A second temporal network 510B may be provided downstream of the neural network 404 and in front of the second heads 420B, to extract temporal features for the second task group. The second temporal network 510B may receive and process vectorized spatial maps from neural network 404. A third temporal network 510C may be provided downstream of the neural network 404 and in front of the third heads 420C, to extract temporal features for the third task group. The third temporal network 510C may receive and process vectorized spatial maps from neural network 404. A fourth temporal network 510D may be provided downstream of the neural network 404 and in front of the fourth heads 420D, to extract temporal features for the fourth task group. The fourth temporal network 510D may receive and process vectorized spatial maps from neural network 404.

In some embodiments, multiple temporal networks may be implemented to have different sequence lengths (or different number of time steps). Sequence length may impact the computational complexity of the temporal network (the longer the sequence length, the higher the computational complexity). The temporal network may be arranged to process an input sequence having the configured sequence length. Temporal networks may be implemented to receive and process an input sequence of a certain length. In FIGS. 5-6, the input sequence of various temporal networks may correspond to a number of (vectorized) spatial maps being provided as input to a temporal network. One temporal network may have a first sequence length, and another temporal network may have a second sequence length, where the second sequence length is different from the first sequence length. Sequence length may be decided based on the task group. For example, the first temporal network 510A may be dedicated to a first task group involving extraction of vehicle subtype classifications, and the second temporal network 510B may be dedicated to a second task group involving extraction of vehicle signal attributes. The sequence length of the first temporal network 510A may be shorter than the sequence length of the second temporal network 510B.

Some vehicle understanding tasks or task groups may benefit from identifying states or extracting features of specific parts of a vehicle. Those tasks or task groups may benefit from inputs that exhibit strong signals for certain parts of a vehicle. Part-awareness may improve performance of certain tasks or task groups. For example, extracting emergency vehicle attributes may benefit from having features or states that are localized to a light bar of the vehicle. Extracting school bus attributes may benefit from features or states that are localized to the lights and stop sign parts of the vehicle. Extracting vehicle signal attributes may benefit from features or states that are localized to tail light areas of a vehicle. Extracting open door attributes may benefit from features or states that are localized to door areas of a vehicle. When using neural network 404, the output spatial maps globally averages the features or states of various parts of the vehicle (e.g., potentially attenuating the signals from certain parts of the vehicle). Therefore, the global feature maps may not provide sufficient information that allows a downstream model to distinguish between different (localized) parts of a vehicle. Furthermore, global averaging of the features may obscure underlying reasons for why certain task groups are not performing well enough.

To address some of these concerns, the shared layers or shared backbone may include part-aware machine learning. Part-aware machine learning may include detection of parts and location of the parts, and extraction of per part features. In FIG. 6, the shared layers or shared backbone may include part detector 602 to generate an output 604 that is part-aware. The part-aware output 604 may indicate whether a specific part is present or not present (e.g., a Boolean indicator). The part-aware output 604 may indicate location of a specific part, e.g., bounding box information, or coordinate information identifying location of a part on a bounding box. Output 604 can include global features 620 per frame of the sensor data, and one or more part features 630 per frame of the sensor data. Output 604 can further include one or more bounding boxes corresponding to the one or more part features. One or more part features 630 may include first part features 610, second part features 612, third part features 614, fourth part features 616. For example, first part features 610 may include left light features and bounding box information of the left light. Second part features 612 may include right light features and bounding box information of the right light. Third part features 614 may include left door features and bounding box information of the left door. Fourth part features 616 may include emergency vehicle light bar features and bounding box information of the emergency vehicle light bar. Features may have 0's as values if the part is not detected by part detector 602.

Not all part features may be relevant or salient for a task or task group. For example, extraction of open door attributes may not need to process part features associated with emergency vehicle light bars. A task group may have certain part features of interest. Extraction of vehicle signal light attributes may benefit from part features associated with left light, right light, front lights, rear lights, etc. To avoid overloading downstream task group specific networks with part information that is not as relevant, a filter may be included to mask selected part features in output 604. The masking may be task group specific so that the part features that are processed by downstream task specific networks are not overloaded with part features that are irrelevant. Masking may also reduce the size of input features to be processed by the downstream task specific models, which would reduce computational complexity. In FIG. 6, the architecture may include a first masking filter 640A, a second masking filter 640B, a third masking filter 640C, and a fourth masking filter 640D. First masking filter 640A may mask one or more part features that are not salient for the first task group. Second masking filter 640B may mask one or more part features that are not salient for the second task group. Third masking filter 640C may mask one or more part features that are not salient for the third task group. Fourth masking filter 640D may mask one or more part features that are not salient for the fourth task group.

In some cases, it may be beneficial to process the global features and/or part features to extract relationships between them. There may be relationships between features for a certain part and features for another part. There may be relationships between features of a certain part and the global features. If desired, the architecture in FIG. 6 may include one or more part attention neural networks, dedicated to one or more task groups to extract these relationships. A part attention neural network can receive output 604, or a filtered version of output 604 (e.g., an output of a masking filter). The part attention neural network can learn relationships between the part features or between part features and global features. The part attention neural network can combine part features and global features to extract a part-attended feature vector. A sequence of part-attended feature vectors for a plurality for timestamps can be provided as input to a temporal network dedicated to the task group (to extract temporal features).

In FIG. 6, the architecture may include, e.g., first part attention neural network 650A, second part attention neural network 650B, third part attention neural network 650C . . . and fourth part attention neural network 650D. First part attention neural network 650A may receive global features and/or part features that are salient for the first task group, and output a part-attended feature vector for the first task group. Second part attention neural network 650B may receive global features and/or part features that are salient for the second task group, and output a part-attended feature vector for the second task group. Third part attention neural network 650C may receive global features and/or part features that are salient for the third task group, and output a part-attended feature vector for the third task group. Fourth part attention neural network 650D may receive global features and/or part features that are salient for the fourth task group, and output a part-attended feature vector for the fourth task group.

In FIG. 6, the multi-task learning architecture has several advantages. By tuning task groups to utilize certain parts, diagnosis of events (e.g., poor performance of a certain task) can be regressed to parts of a vehicle (making certain events easier to explain). Even though having task group specific networks and parts may increase computational complexity, the task group specific networks are configured to utilize parts that are most relevant to the task group, which can greatly improve performance of the task group. Implementing task group specific networks means that the networks are individually configurable for different task groups to reduce computational complexity when additional processing is not needed for a task group to achieve a certain level of performance.

Exemplary Method for Understanding Vehicles

Figure 7:
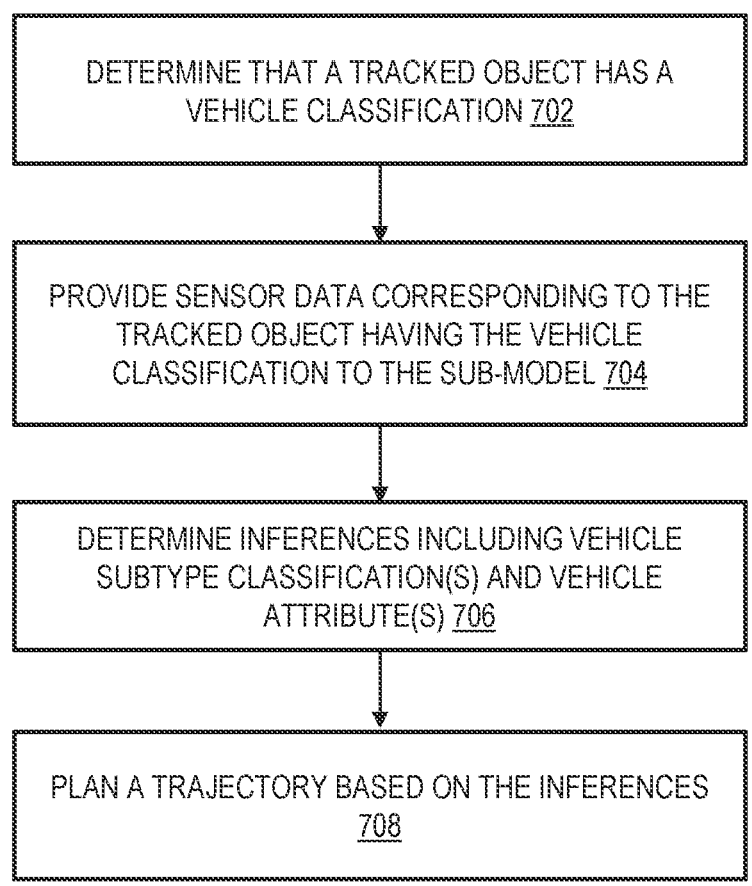
FIG. 7 illustrates an exemplary method for understanding vehicles and controlling a vehicle based on the understanding, according to some aspects of the disclosed technology.

FIG. 7 illustrates an exemplary method for understanding vehicles and controlling a vehicle based on the understanding, according to some aspects of the disclosed technology. The method may be carried out by components illustrated in the figures. While not shown, a tracker such as tracking part 202 may be implemented to track objects in sensor data. In 702, a main understanding model, e.g., main understanding model 302 of FIG. 3) may determine that a tacked object has a vehicle classification. In 704, sensor data corresponding to the tracked object having the vehicle classification may be provided to a sub-model, e.g., vehicle understanding sub-model 304 of the figures. In 706, the sub-model may determine a plurality of inferences based on the sensor data. The inferences may include one or more vehicle subtype classifications and one or more vehicle attributes. Determining the inferences may include processing the sensor data using a shared backbone, processing outputs of the shared backbone by one or more temporal networks dedicated to one or more task groups, and generating inferences based on respective outputs of the temporal networks by heads that are dedicated to the respective tasks groups. Exemplary architectures for implementing a model to determine the inferences are described with FIGS. 4-6. In 708, a planner may plan a trajectory of the vehicle based on the inferences. Various ways the inferences may impact the vehicle are described with FIGS. 1-4.

In some embodiments, the main model may produce a (coarse) road user inference that selects between different (coarse) road user classifications.

In some embodiments, the sensor data corresponding to the tracked object having the vehicle classification comprises an image cropped based on a projection of a bounding box corresponding to the tracked object onto a camera image.

In some embodiments, the method may further include vehicle understanding fusion, such as geometric fusion and semantic fusion illustrated in FIG. 3. The method may include determining, by one or more further sub-models, a plurality of other inferences based on other sensor data captured by a second sensor and fusing the inferences from the sub-model and the other inferences from the one or more further sub-models to form final vehicle understanding inferences.

In some embodiments, determining the inferences may involve part-based understanding techniques, as illustrated in FIG. 6. Processing the sensor data using the shared backbone may include detecting global features per frame of the sensor data; and detecting one or more part features per frame of the sensor data. Determining the plurality of inferences may further include filtering out one or more part features and processing the global features and a subset of the one or more part features by a part attention neural network model. The one of the one or more temporal networks may receive and process part-attended feature vectors for a plurality of timestamps from the part attention neural network model.

Exemplary AV Management System

Figure 8:
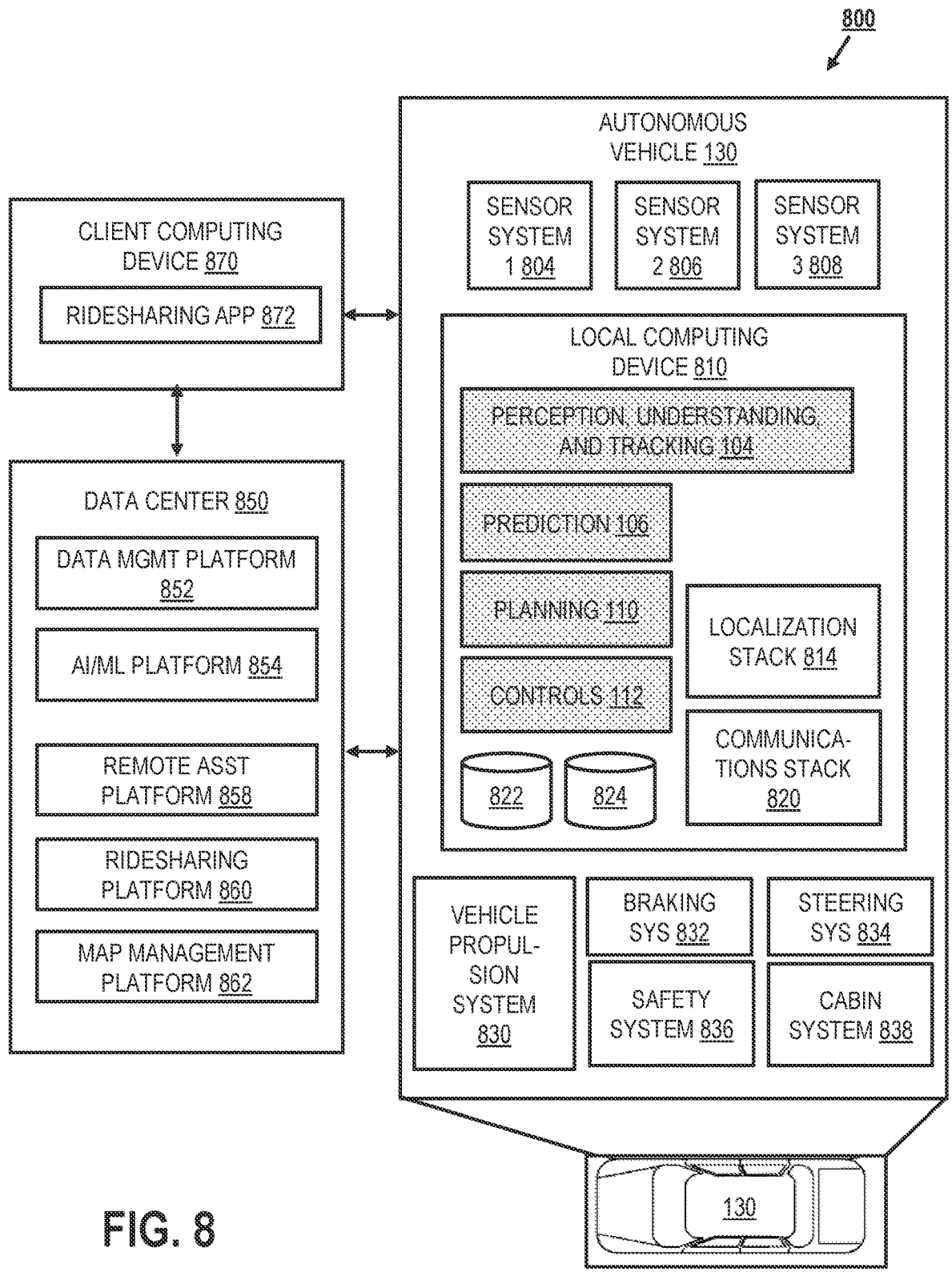
FIG. 8 illustrates an exemplary system environment that may be used to facilitate AV operations, according to some aspects of the disclosed technology.

Turning now to FIG. 8, this figure illustrates an example of an AV management system 800, in which some of the aspects of the present disclosure can be implemented. One of ordinary skill in the art will understand that, for the AV management system 800 and any system discussed in the present disclosure, there may be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 800 includes an AV 130, a data center 850, and a client computing device 870. The AV 130, the data center 850, and the client computing device 870 may communicate with one another over one or more networks (not shown), such as a public network (e.g., the Internet, an Infrastructure as a Service (IaaS) network, a Platform as a Service (PaaS) network, a Software as a Service (SaaS) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 130 may navigate about roadways without a human driver based on sensor signals generated by multiple sensor systems 804, 806, and 808. The sensor systems 804-808 may include different types of sensors and may be arranged about the AV 130. For instance, the sensor systems 804-808 may comprise Inertial Measurement Units (IMUs), cameras (e.g., still image cameras, video cameras, thermal cameras, signal cameras, etc.), light sensors (e.g., light detecting and ranging (LIDAR) systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), time-of-flight sensors, structured light sensor, infrared sensors, signal light sensors, thermal imaging sensors, engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 804 may be a camera system, the sensor system 806 may be a LIDAR system, and the sensor system 808 may be a RADAR system. Other embodiments may include any other number and type of sensors.

AV 130 may also include several mechanical systems that may be used to maneuver or operate AV 130. For instance, mechanical systems may include vehicle propulsion system 830, braking system 832, steering system 834, safety system 836, and cabin system 838, among other systems. Vehicle propulsion system 830 may include an electric motor, an internal combustion engine, or both. The braking system 832 may include an engine brake, a wheel braking system (e.g., a disc braking system that utilizes brake pads), hydraulics, actuators, and/or any other suitable componentry configured to assist in decelerating AV 130. The steering system 834 may include suitable componentry configured to control the direction of movement of the AV 130 during navigation. Safety system 836 may include lights and signal indicators, a parking brake, airbags, and so forth. The cabin system 838 may include cabin temperature control systems, in-cabin entertainment systems, and so forth. In some embodiments, the AV 130 may not include human driver actuators (e.g., steering wheel, handbrake, foot brake pedal, foot accelerator pedal, turn signal lever, window wipers, etc.) for controlling the AV 130. Instead, the cabin system 838 may include one or more client interfaces (e.g., GUIs, Voice User Interfaces (VUIs), etc.) for controlling certain aspects of the mechanical systems 830-838.

AV 130 may additionally include a local computing device 810 that is in communication with the sensor systems 804-808, the mechanical systems 830-838, the data center 850, and the client computing device 870, among other systems. The local computing device 810 may include one or more processors and memory, including instructions that may be executed by the one or more processors. The instructions may make up one or more software stacks or components responsible for controlling the AV 130; communicating with the data center 850, the client computing device 870, and other systems; receiving inputs from riders, passengers, and other entities within the AV's environment; logging metrics collected by the sensor systems 804-808; and so forth. In this example, the local computing device 810 includes a perception, understanding, and tracking part 104, a mapping and localization stack 814, a prediction part 106, a planning part 110, and controls part 112, a communications stack 820, an HD geospatial database 822, and an AV operational database 824, among other stacks and systems.

Perception, understanding, and tracking part 104 may enable the AV 130 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 804-808, the mapping and localization stack 814, the HD geospatial database 822, other components of the AV, and other data sources (e.g., the data center 850, the client computing device 870, third-party data sources, etc.). The perception, understanding, and tracking part 104 may detect and classify objects and determine their current and predicted locations, speeds, directions, and the like. In addition, the perception, understanding, and tracking part 104 may determine the free space around the AV 130 (e.g., to maintain a safe distance from other objects, change lanes, park the AV, etc.). The perception, understanding, and tracking part 104 may also identify environmental uncertainties, such as where to look for moving objects, flag areas that may be obscured or blocked from view, and so forth. Exemplary implementations of perception, understanding, and tracking part 104 are illustrated in the figures.

Prediction part 106 may predict behaviors and movements of tracked objects sensed by perception, understanding, and tracking part 104.

Mapping and localization stack 814 may determine the AV's position and orientation (pose) using different methods from multiple systems (e.g., GPS, IMUs, cameras, LIDAR, RADAR, ultrasonic sensors, the HD geospatial database 822, etc.). For example, in some embodiments, the AV 130 may compare sensor data captured in real-time by the sensor systems 804-808 to data in the HD geospatial database 822 to determine its precise (e.g., accurate to the order of a few centimeters or less) position and orientation. The AV 130 may focus its search based on sensor data from one or more first sensor systems (e.g., GPS) by matching sensor data from one or more second sensor systems (e.g., LIDAR). If the mapping and localization information from one system is unavailable, the AV 130 may use mapping and localization information from a redundant system and/or from remote data sources.

Planning part 110 may determine how to maneuver or operate the AV 130 safely and efficiently in its environment. For instance, the planning part 110 may produce a plan for the AV 130, which can include a (reference) trajectory. Planning part 110 may receive information generated by perception, understanding, and tracking part 104. For example, the planning part 110 may receive the location, speed, and direction of the AV 130, geospatial data, data regarding objects sharing the road with the AV 130 (e.g., pedestrians, bicycles, vehicles, ambulances, buses, cable cars, trains, traffic lights, lanes, road markings, etc.) or certain events occurring during a trip (e.g., an emergency vehicle (EMV) blaring a siren, intersections, occluded areas, street closures for construction or street repairs, DPVs, etc.), user input, and other relevant data for directing the AV 130 from one point to another. The planning part 110 may determine multiple sets of one or more mechanical operations that the AV 130 may perform (e.g., go straight at a specified speed or rate of acceleration, including maintaining the same speed or decelerating; turn on the left-blinker, decelerate if the AV is above a threshold range for turning, and turn left; turn on the right-blinker, accelerate if the AV is stopped or below the threshold range for turning, and turn right; decelerate until completely stopped and reverse; etc.), and select the best one to meet changing road conditions and events.

Controls part 112 may manage the operation of the vehicle propulsion system 830, the braking system 832, the steering system 834, the safety system 836, and the cabin system 838. Controls part 112 may receive a plan from the planning part 110. The controls part 112 may receive sensor signals from the sensor systems 804-808 as well as communicate with other stacks or components of the local computing device 810 or a remote system (e.g., the data center 850) to effectuate the operation of the AV 130. For example, the controls part 112 may implement the final path or actions from the multiple paths or actions provided by the planning part 110. The implementation may involve turning the plan from the planning part 110 into commands for vehicle hardware controls such as the actuators that control the AV's steering, throttle, brake, and drive unit.

The communication stack 820 may transmit and receive signals between the various stacks and other components of the AV 130 and between the AV 130, the data center 850, the client computing device 870, and other remote systems. The communication stack 820 may enable the local computing device 810 to exchange information remotely over a network. Communication stack 820 may also facilitate local exchange of information, such as through a wired connection or a local wireless connection.

The HD geospatial database 822 may store HD maps and related data of the streets upon which the AV 130 travels. In some embodiments, the HD maps and related data may comprise multiple layers, such as an areas layer, a lanes and boundaries layer, an intersections layer, a traffic controls layer, and so forth. The areas layer may include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer may include geospatial information of road lanes (e.g., lane or road centerline, lane boundaries, type of lane boundaries, etc.) and related attributes (e.g., direction of travel, speed limit, lane type, etc.). The lanes and boundaries layer may also include 3D attributes related to lanes (e.g., slope, elevation, curvature, etc.). The intersections layer may include geospatial information of intersections (e.g., crosswalks, stop lines, turning lane centerlines, and/or boundaries, etc.) and related attributes (e.g., permissive, protected/permissive, or protected only left-turn lanes; permissive, protected/permissive, or protected only U-turn lanes; permissive or protected only right-turn lanes; etc.). The traffic controls layer may include geospatial information of traffic signal lights, traffic signs, and other road objects and related attributes.

The AV operational database 824 may store raw AV data generated by the sensor systems 804-808 and other components of the AV 130 and/or data received by the AV 130 from remote systems (e.g., the data center 850, the client computing device 870, etc.). In some embodiments, the raw AV data may include HD LIDAR point cloud data, image or video data, RADAR data, GPS data, and other sensor data that the data center 850 may use for creating or updating AV geospatial data as discussed further below with respect to FIG. 5 and elsewhere in the present disclosure.

Data center 850 may be a private cloud (e.g., an enterprise network, a co-location provider network, etc.), a public cloud (e.g., an IaaS network, a PaaS network, a SaaS network, or other CSP network), a hybrid cloud, a multi-cloud, and so forth. The data center 850 may include one or more computing devices remote to the local computing device 810 for managing a fleet of AVs and AV-related services. For example, in addition to managing the AV 130, the data center 850 may also support a ridesharing service, a delivery service, a remote/roadside assistance service, street services (e.g., street mapping, street patrol, street cleaning, street metering, parking reservation, etc.), and the like.

The data center 850 may send and receive various signals to and from the AV 130 and the client computing device 870. These signals may include sensor data captured by the sensor systems 804-808, roadside assistance requests, software updates, ridesharing pick-up and drop-off instructions, and so forth. In this example, the data center 850 includes one or more of a data management platform 852, an Artificial Intelligence/Machine Learning (AI/ML) platform 854, a remote assistance platform 858, a ridesharing platform 860, and a map management platform 862, among other systems.

Data management platform 852 may be a "big data" system capable of receiving and transmitting data at high speeds (e.g., near real-time or real-time), processing a large variety of data, and storing large volumes of data (e.g., terabytes, petabytes, or more of data). The varieties of data may include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of data center 850 may access data stored by the data management platform 852 to provide their respective services.

The AI/ML platform 854 may provide the infrastructure for training and evaluating machine learning algorithms for operating the AV 130, the remote assistance platform 858, the ridesharing platform 860, the map management platform 862, and other platforms and systems. Using the AI/ML platform 854, data scientists may prepare data sets from the data management platform 852; select, design, and train machine learning models; evaluate, refine, and deploy the models; maintain, monitor, and retrain the models; and so on.

The remote assistance platform 858 may generate and transmit instructions regarding the operation of the AV 130. For example, in response to an output of the AI/ML platform 854 or other system of the data center 850, the remote assistance platform 858 may prepare instructions for one or more stacks or other components of the AV 130.

The ridesharing platform 860 may interact with a customer of a ridesharing service via a ridesharing application 872 executing on the client computing device 870. The client computing device 870 may be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general-purpose computing device for accessing the ridesharing application 872. The client computing device 870 may be a customer's mobile computing device or a computing device integrated with the AV 130 (e.g., the local computing device 810). The ridesharing platform 860 may receive requests to be picked up or dropped off from the ridesharing application 872 and dispatch the AV 130 for the trip.

Map management platform 862 may provide a set of tools for the manipulation and management of geographic and spatial (geospatial) and related attribute data. The data management platform 852 may receive LIDAR point cloud data, image data (e.g., still image, video, etc.), RADAR data, GPS data, and other sensor data (e.g., raw data) from one or more AVs 130, Unmanned Aerial Vehicles (UAVs), satellites, third-party mapping services, and other sources of geospatially referenced data.

In some embodiments, the map viewing services of map management platform 862 may be modularized and deployed as part of one or more of the platforms and systems of the data center 850. For example, the AI/ML platform 854 may incorporate the map viewing services for visualizing the effectiveness of various object detection or object classification models, the remote assistance platform 858 may incorporate the map viewing services for replaying traffic incidents to facilitate and coordinate aid, the ridesharing platform 860 may incorporate the map viewing services into the client application 872 to enable passengers to view the AV 130 in transit enroute to a pick-up or drop-off location, and so on.

Exemplary Processor-Based System

Figure 9:
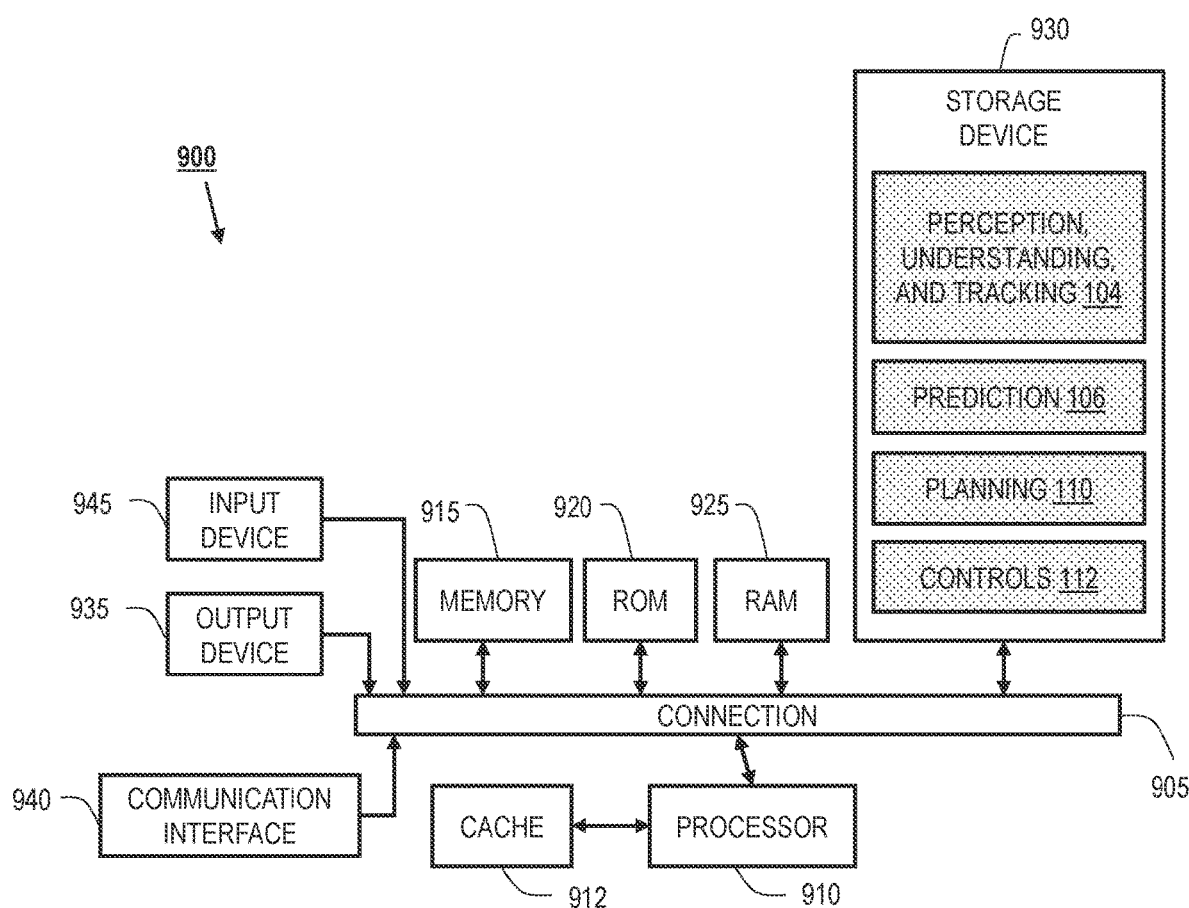
FIG. 9 illustrates an exemplary computing system with which some aspects of the subject technology may be implemented.

FIG. 9 illustrates an exemplary computing system with which some aspects of the subject technology may be implemented. For example, processor-based system 900 may be any computing device making up, or any component thereof in which the components of the system are in communication with each other using connection 905. Connection 905 may be a physical connection via a bus, or a direct connection into processor 910, such as in a chipset architecture. Connection 905 may also be a virtual connection, networked connection, or logical connection.

In some embodiments, computing system 900 represents the local computing device 810 of FIG. 8. In some embodiments, one or more of the described system components represents many such components each performing some or all of the function for which the component is described. In some embodiments, the components may be physical or virtual devices.

Exemplary system 900 includes at least one processor 910 and connection 905 that couples various system components including system memory 915, such as Read-Only Memory (ROM) 920 and Random-Access Memory (RAM) 925 to processor 910, at least one processor 910 may include one or more of: Central Processing Unit (CPU), Graphical Processing Unit (GPU), machine learning processor, neural network processor, or some other suitable computing processor. Computing system 900 may include a cache of high-speed memory 912 connected directly with, in close proximity to, or integrated as part of processor 910.

Processor 910 may include any general-purpose processor and a hardware service or software service. Processor 910 may essentially be a completely self-contained computing system, containing multiple cores or processors, a bus, memory controller, cache, etc. A multi-core processor may be symmetric or asymmetric.

Storage device 930 may be a non-volatile and/or non-transitory and/or computer-readable memory device and may be a hard disk or other types of computer-readable media which may store data that is accessible by a computer.

Storage device 930 may include software services, servers, services, etc., that when the code that defines such software is executed by the processor 910, it causes the system 900 to perform a function. Storage device 930 may store instructions that encode functionalities of perception, understanding, and tracking part 104, prediction part 106, planning part 110, and controls part 112. In some embodiments, a hardware service that performs a particular function may include the software component stored in a computer-readable medium in connection with the necessary hardware components, such as processor 910, connection 905, output device 935, etc., to carry out the function.

To enable user interaction, computing system 900 includes an input device 945, which may represent any number of input mechanisms, such as a microphone for speech, a touch-sensitive screen for gesture or graphical input, keyboard, mouse, motion input, speech, etc. Computing system 900 may also include output device 935, which may be one or more of a number of output mechanisms known to those of skill in the art. In some instances, multimodal systems may enable a user to provide multiple types of input/output to communicate with computing system 900. Computing system 900 may include communications interface 940, which may generally govern and manage the user input and system output. The communication interface may perform or facilitate receipt and/or transmission of wired or wireless communications via wired and/or wireless transceivers.

Embodiments within the scope of the present disclosure may also include tangible and/or non-transitory computer-readable storage media or devices for carrying or having computer-executable instructions or data structures stored thereon. Such tangible computer-readable storage devices may be any available device that may be accessed by a general-purpose or special-purpose computer, including the functional design of any special-purpose processor as described above. By way of example, and not limitation, such tangible computer-readable devices may include RAM, ROM, EEPROM, CD-ROM or other optical disk storage, magnetic disk storage or other magnetic storage devices, or any other device which may be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Select Examples

Example 1 is a vehicle comprising: sensors; one or more processors; and one or more storage media encoding instructions executable by the one or more processors to implement an understanding part, wherein the understanding part includes: a main understanding model to classify a tracked object into at least one of: one or more road user classifications and a vehicle classification; and a sub-model to output inferences for a plurality of task groups, the sub-model including: a shared backbone to receive and process sensor data generated from the sensors corresponding to tracked objects having the vehicle classification; one or more temporal networks dedicated to one or more task groups; and heads to output inferences for the respective task groups, wherein the inferences include one or more vehicle subtype classifications and one or more vehicle attributes.

In Example 2, the vehicle of Example 1 can optionally include the task groups comprising: a first task group to extract an emergency vehicle classification, extract emergency vehicle subtype classifications, and extract one or more emergency vehicle flashing light attributes.

In Example 3, the vehicle of Example 1 or 2 can optionally include the task groups comprising: a second task group to extract vehicle signal attributes.

In Example 4, the vehicle of any one of Examples 1-3 can optionally include the task groups comprising: a third task group to extract school bus classification, extract one or more school bus flashing light attributes, and extract one or more school bus activeness attributes.

In Example 5, the vehicle of any one of Examples 1-4 can optionally include the task groups comprising: a fourth task group to extract vehicle subtype classifications and extract one or more vehicle attributes.

In Example 6, the vehicle of any one of Examples 1-5 can optionally include the task groups comprising: a fifth task group to extract vehicle subtype classifications.

In Example 7, the vehicle of any one of Examples 1-6 can optionally include the task groups comprising: a sixth task group to extract one or more vehicle open door attributes.

In Example 8, the vehicle of any one of Examples 1-7, wherein the shared backbone comprises a deep neural network.

In Example 9, the vehicle of any one of Examples 1-8 can optionally include the one or
more temporal networks comprising one or more long short-term memory neural networks dedicated to one or more respective task groups.

In Example 10, the vehicle of any one of Examples 1-9 can optionally include the one or more temporal networks comprise one or more multi-head attention neural networks dedicated to one or more respective task groups.

In Example 11, the vehicle of any one of Examples 1-10 can optionally include the shared backbone comprising a part detector to output global features per frame of the sensor data, and one or more part features per frame of the sensor data.

In Example 12, the vehicle of Example 11 can optionally include the part detector further outputting one or more bounding boxes corresponding to the one or more part features.

In Example 13, the vehicle of Example 11 or 12 can optionally include the shared backbone further comprising one or more masking filters to mask one or more part features.

In Example 14, the vehicle of any one of Examples 11-13 can optionally include the sub-model further comprising one or more part attention neural networks dedicated to one or more respective task groups.

In Example 15, the vehicle of Example 14, wherein the one or more temporal networks receive part-attended feature vectors for a plurality of timestamps.

In Example 16, the vehicle of any one of Examples 1-15 can optionally include the heads comprising fully connected neural network layers for the respective task groups.

In Example 17, the vehicle of any one of Examples 1-16 can optionally include the understanding part further including a vehicle understanding fusion part to receive at least one of the inferences generated by the plurality of heads and one or more inferences generated by one or more other sub-models.

In Example 18, the vehicle of any one of Examples 1-17 can optionally include the one or more storage encoding instructions executable by the one or more processors further implementing a tracking part to receive at least one of the inferences generated by the heads.

In Example 19, the vehicle of any one of Examples 1-18 can optionally include the one or more storage encoding instructions executable by the one or more processors further implementing a prediction part to receive at least one of the inferences generated by the heads, and to predict behaviors of tracked objects in an environment of the vehicle based on the at least one of the inferences.

In Example 20, the vehicle of any one of Examples 1-19 can optionally include the one or more storage encoding instructions executable by the one or more processors further implementing a planning part to receive at least one of the inferences generated by the plurality of heads and to generate a trajectory for the vehicle based on the at least one of the inferences.

Example 21 is a computer-implemented method for understanding vehicles and controlling a vehicle based on the understanding, the method comprising: determining, by a main understanding model, that a tracked object has a vehicle classification; providing sensor data corresponding to the tracked object having the vehicle classification to a sub-model; determining, by the sub-model, a plurality of inferences based on the sensor data from a first sensor, wherein: determining the plurality of inferences comprises: processing the sensor data using a shared backbone; processing outputs of the shared backbone by one or more temporal networks dedicated to one or more task groups; and generating inferences based on respective outputs of the temporal networks by heads that are dedicated to the respective tasks groups; and the inferences include one or more vehicle subtype classifications and one or more vehicle attributes; and planning a trajectory of the vehicle based on the inferences.

In Example 22, the computer-implemented method of Example 21 can optionally include the main understanding model producing a road user inference that selects between different road user classifications.

In Example 23, the computer-implemented method of Example 21 or 22 can optionally include the sensor data corresponding to the tracked object having the vehicle classification comprising an image cropped based on a projection of a bounding box corresponding to the tracked object onto a camera image.

In Example 24, the computer-implemented method of any one of Examples 21-23 can optionally include determining, by one or more further sub-models, a plurality of other inferences based on other sensor data captured by a second sensor; and fusing the inferences from the sub-model and the other inferences from the one or more further sub-models to form final vehicle understanding inferences.

In Example 25, the computer-implemented method of any one of Examples 21-23 can optionally include processing the sensor data using the shared backbone comprising: detecting global features per frame of the sensor data; and detecting one or more part features per frame of the sensor data.

In Example 26, the computer-implemented method of Example 25 can optionally include determining the plurality of inferences further comprising: filtering out one or more part features; and processing the global features and a subset of the one or more part features by a part attention neural network model; wherein the one of the one or more temporal networks receive and process part-attended feature vectors for a plurality of timestamps from the part attention neural network model.

Example 27 includes one or more non-transient storage media encoding instructions executable by the one or more processors to implement an understanding part, wherein the understanding part includes: a shared backbone to receive and process sensor data generated from the sensors corresponding to tracked objects having the vehicle classification, wherein the shared backbone includes a part detector to extract global features and a set of one or more part features per frame of the sensor data; one or more part attention neural networks, downstream of the part detector, dedicated to one or more task groups; one or more temporal networks dedicated to one or more task groups; and heads to output inferences for the respective task groups, wherein the inferences include one or more vehicle subtype classifications and one or more vehicle attributes.

In Example 28, the one or more non-transient storage media of Example 27 can optionally include the understanding part further including: one or more filters dedicated to one or more task groups to select one or more part features in the set of the one or more part features.

In Example 29, the one or more non-transient storage media of Example 27 or 28 can optionally include the one or more part attention neural networks comprising: a first part attention neural network to receive the global features and selected one or more part features of the one or more part features.

In Example 30, the one or more non-transient storage media of any one of Examples 27-29 can optionally include the one or more temporal networks comprising: a first temporal network to receive part-attended feature vectors for a plurality of timestamps.

Example 31 includes one or more non-transitory computer-readable media storing instructions that, when executed by one or more processors, cause the one or more processors to perform any one of the computer-implemented methods of Examples 21-26.

Example 32 is an apparatus comprising means to carry out any one of the computer-implemented methods of Examples 21-26.

What is claimed is:

1. A vehicle comprising:
    sensors;
    one or more processors; and
    one or more storage media encoding instructions executable by the one or more processors to implement an understanding part, wherein the understanding part includes:
    a main understanding model to classify a tracked object into at least one of: one or more road user classifications and a vehicle classification; and
    a sub-model to output inferences for a plurality of task groups, the sub-model including:
    a shared backbone to receive and process sensor data generated from the sensors corresponding to tracked objects having the vehicle classification;
    one or more temporal networks dedicated to one or more task groups; and
    heads to output inferences for the respective task groups, wherein the inferences include one or more vehicle subtype classifications and one or more vehicle attributes,
    wherein the vehicle further includes a planning part configured to plan a trajectory of the vehicle based on the inferences generated by the heads, and a controls part configured to execute the planned trajectory by controlling one or more mechanical systems of the vehicle.

2. The vehicle of claim 1, wherein the task groups comprise:
    a first task group to extract an emergency vehicle classification, extract emergency vehicle subtype classifications, and extract one or more emergency vehicle flashing light attributes.

3. The vehicle of claim 1, wherein the task groups comprise:
    a second task group to extract vehicle signal attributes.

4. The vehicle of claim 1, wherein the task groups comprise:
    a third task group to extract school bus classification, extract one or more school bus flashing light attributes, and extract one or more school bus activeness attributes.

5. The vehicle of claim 1, wherein the task groups comprise:
    a fourth task group to extract vehicle subtype classifications and extract one or more vehicle attributes.

6. The vehicle of claim 1, wherein the task groups comprise:
a fifth task group to extract vehicle subtype classifications.

7. The vehicle of claim 1, wherein the task groups comprise:
a sixth task group to extract one or more vehicle open door attributes.

8. The vehicle of claim 1, wherein the shared backbone comprises a deep neural network.

9. The vehicle of claim 1, wherein the one or more temporal networks comprise one or more long short-term memory neural networks dedicated to one or more respective task groups.

10. The vehicle of claim 1, wherein the one or more temporal networks comprise one or more multi-head attention neural networks dedicated to one or more respective task groups.

11. The vehicle of claim 1, wherein the shared backbone comprises a part detector to output global features per frame of the sensor data, and one or more part features per frame of the sensor data.

12. The vehicle of claim 11, wherein the part detector further outputs one or more bounding boxes corresponding to the one or more part features.

13. The vehicle of claim 11, wherein the shared backbone further comprises one or more masking filters to mask one or more part features.

14. The vehicle of claim 11, wherein the sub-model further comprises one or more part attention neural networks dedicated to one or more respective task groups.

15. The vehicle of claim 14, wherein the one or more temporal networks receive part-attended feature vectors for a plurality of timestamps.

16. The vehicle of claim 1, wherein the heads comprise fully connected neural network layers for the respective task groups.

17. The vehicle of claim 1, wherein the understanding part further includes a vehicle understanding fusion part to receive at least one of the inferences generated by the heads and one or more inferences generated by one or more other sub-models.

18. A computer-implemented method for understanding vehicles and controlling a vehicle based on the understanding, the method comprising:
determining, by a main understanding model, that a tracked object has a vehicle classification;
providing sensor data corresponding to the tracked object having the vehicle classification to a sub-model;
determining, by the sub-model, a plurality of inferences based on the sensor data from a first sensor, wherein:
determining the plurality of inferences comprises:
processing the sensor data using a shared backbone;
processing outputs of the shared backbone by one or more temporal networks dedicated to one or more task groups; and
generating inferences based on respective outputs of the temporal networks by heads that are dedicated to the respective tasks groups; and
the inferences include one or more vehicle subtype classifications and one or more vehicle attributes; and
planning a trajectory of the vehicle based on the inferences.

19. The computer-implemented method of claim 18, further comprising:
determining, by one or more further sub-models, a plurality of other inferences based on other sensor data captured by a second sensor; and
fusing the inferences from the sub-model and the other inferences from the one or more further sub-models to form final vehicle understanding inferences.

20. One or more non-transient storage media encoding instructions executable by one or more processors to implement an understanding part for a vehicle, wherein the understanding part includes:
a shared backbone to receive and process sensor data generated from the sensors corresponding to tracked objects having a vehicle classification, wherein the shared backbone includes a part detector to extract global features and a set of one or more part features per frame of the sensor data;
one or more part attention neural networks, downstream of the part detector, dedicated to one or more task groups;
one or more temporal networks dedicated to one or more task groups; and
heads to output inferences for the respective task groups, wherein the inferences include one or more vehicle subtype classifications and one or more vehicle attributes,
wherein the instructions further implement a planning part configured to plan a trajectory of the vehicle based on the inferences generated by the heads, and a controls part configured to execute the planned trajectory by controlling one or more mechanical systems of the vehicle.

* * * * *